(12) United States Patent
Tanaka et al.

(10) Patent No.: US 11,201,697 B2
(45) Date of Patent: Dec. 14, 2021

(54) INFORMATION PROCESSING APPARATUS AND COMMUNICATION SYSTEM

(71) Applicant: SONY CORPORATION, Tokyo (JP)

(72) Inventors: Yusuke Tanaka, Tokyo (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/768,886

(22) PCT Filed: Sep. 21, 2016

(86) PCT No.: PCT/JP2016/077799
§ 371 (c)(1),
(2) Date: Apr. 17, 2018

(87) PCT Pub. No.: WO2017/077781
PCT Pub. Date: May 11, 2017

(65) Prior Publication Data
US 2018/0309543 A1    Oct. 25, 2018

(30) Foreign Application Priority Data
Nov. 2, 2015   (JP) .............................. JP2015-215389

(51) Int. Cl.
*H04L 1/16*     (2006.01)
*H04W 28/04*    (2009.01)
(Continued)

(52) U.S. Cl.
CPC ......... *H04L 1/1614* (2013.01); *H04B 7/0452* (2013.01); *H04L 5/0091* (2013.01);
(Continued)

(58) Field of Classification Search
None
See application file for complete search history.

(56) References Cited

U.S. PATENT DOCUMENTS

| RE44,198 E | 5/2013 | An et al. |
| 8,964,558 B2 * | 2/2015 | Kikuzuki .......... H04W 52/0222 370/235 |

(Continued)

FOREIGN PATENT DOCUMENTS

| AR | 063187 A1 | 12/2008 |
| AT | 437494 A1 | 8/2009 |

(Continued)

OTHER PUBLICATIONS

International Search Report and Written Opinion of PCT Application No. PCT/JP2016/077799, dated Oct. 18, 2016, 10 pages of ISRWO.

(Continued)

*Primary Examiner* — Noel R Beharry
*Assistant Examiner* — Rodrick Mak
(74) *Attorney, Agent, or Firm* — Chip Law Group

(57) ABSTRACT

The present invention relates to performing properly wireless communications. A communication system includes a first information processing apparatus and a plurality of second information processing apparatuses. The first information processing apparatus is an information processing apparatus that assigns a plurality of channel resources for wireless communications to the plurality of second information processing apparatuses and notify the plurality of second information processing apparatuses of the assignments. The second information processing apparatuses, upon receipt of the notification, transmit to the first information processing apparatus a plurality of signals for providing predetermined information to the first information processing apparatus by using the plurality of assigned channel resources.

9 Claims, 27 Drawing Sheets

(51) Int. Cl.
*H04W 84/12* (2009.01)
*H04W 16/28* (2009.01)
*H04L 5/00* (2006.01)
*H04W 72/12* (2009.01)
*H04W 72/04* (2009.01)
*H04W 74/06* (2009.01)
*H04B 7/0452* (2017.01)
*H04W 16/24* (2009.01)
*H04W 4/70* (2018.01)
*H04W 52/02* (2009.01)

(52) U.S. Cl.
CPC ........... *H04W 16/24* (2013.01); *H04W 16/28* (2013.01); *H04W 28/04* (2013.01); *H04W 72/04* (2013.01); *H04W 72/1289* (2013.01); *H04W 74/06* (2013.01); *H04W 84/12* (2013.01); *H04L 5/0055* (2013.01); *H04W 4/70* (2018.02); *H04W 52/0216* (2013.01)

(56) References Cited

U.S. PATENT DOCUMENTS

| | | | |
|---|---|---|---|
| 9,319,904 B1* | 4/2016 | Srinivasa | H04L 43/12 |
| 2003/0198249 A1* | 10/2003 | Klein | H04W 28/26 370/449 |
| 2006/0291410 A1 | 12/2006 | Herrmann | |
| 2007/0261082 A1* | 11/2007 | Ji | H04N 21/2662 725/62 |
| 2008/0084844 A1 | 4/2008 | Reznik et al. | |
| 2008/0232291 A1 | 9/2008 | Hus et al. | |
| 2009/0311967 A1 | 12/2009 | Takase et al. | |
| 2009/0323848 A1* | 12/2009 | Guthy | H04B 7/0426 375/267 |
| 2010/0046457 A1* | 2/2010 | Abraham | H04B 7/0408 370/329 |
| 2010/0110905 A1 | 5/2010 | An et al. | |
| 2010/0118825 A1* | 5/2010 | Kawamura | H04L 5/0007 370/330 |
| 2010/0265842 A1* | 10/2010 | Khandekar | H04W 72/0433 370/252 |
| 2011/0096710 A1 | 4/2011 | Liu et al. | |
| 2011/0267948 A1* | 11/2011 | Koc | H04L 5/003 370/235 |
| 2012/0039291 A1* | 2/2012 | Kwon | H04L 1/0026 370/329 |
| 2012/0106517 A1* | 5/2012 | Charbit | H04W 72/04 370/336 |
| 2012/0327865 A1* | 12/2012 | Hottinen | H04W 72/02 370/329 |
| 2013/0315172 A1 | 11/2013 | Reznik et al. | |
| 2014/0198710 A1 | 7/2014 | Herrmann | |
| 2014/0226552 A1* | 8/2014 | Niu | H04W 4/06 370/312 |
| 2014/0247892 A1* | 9/2014 | Williams | H04L 12/66 375/257 |
| 2015/0172012 A1 | 6/2015 | Abeysekera et al. | |
| 2016/0066318 A1* | 3/2016 | Pereira | H04W 74/06 370/329 |
| 2016/0345328 A1 | 11/2016 | Reznik et al. | |
| 2016/0352483 A1* | 12/2016 | Wei | H04L 5/0048 |
| 2017/0078107 A1 | 3/2017 | Itagaki et al. | |
| 2017/0163404 A1* | 6/2017 | Liu | H04W 72/042 |
| 2017/0374654 A1* | 12/2017 | Rapaport | H04W 72/0413 |
| 2018/0070330 A1* | 3/2018 | Chu | H04W 72/06 |
| 2018/0139699 A1* | 5/2018 | Choi | H04W 48/02 |
| 2018/0160454 A1* | 6/2018 | Huang | H04L 27/2613 |
| 2020/0044882 A1 | 2/2020 | Itagaki et al. | |

FOREIGN PATENT DOCUMENTS

| | | |
|---|---|---|
| AT | 485652 A | 11/2010 |
| AU | 2007307013 A1 | 4/2008 |
| BR | PI0715554 A2 | 7/2013 |
| CA | 2611623 A1 | 12/2006 |
| CA | 2666329 A1 | 4/2008 |
| CN | 1836401 A | 9/2006 |
| CN | 101204105 A | 6/2008 |
| CN | 101523966 A | 9/2009 |
| CN | 102057608 A | 5/2011 |
| CN | 103236907 A | 8/2013 |
| CN | 104412694 A | 3/2015 |
| CN | 106105275 A | 11/2016 |
| EP | 1656765 A1 | 5/2006 |
| EP | 1894434 A2 | 3/2008 |
| EP | 2090122 A2 | 8/2009 |
| EP | 2136584 A2 | 12/2009 |
| EP | 2304890 A1 | 4/2011 |
| EP | 2563051 A1 | 2/2013 |
| EP | 2863700 A1 | 4/2015 |
| EP | 3125583 A1 | 2/2017 |
| EP | 3570570 A1 | 11/2019 |
| HK | 1133357 A1 | 3/2014 |
| JP | 2009-303052 A | 12/2009 |
| JP | 4516076 B2 | 8/2010 |
| JP | 2011-526455 A | 10/2011 |
| JP | 2012-165440 A | 8/2012 |
| JP | 5061193 B2 | 10/2012 |
| JP | 2014-053832 A | 3/2014 |
| JP | 2015-008538 A | 1/2015 |
| JP | 2015-159498 A | 9/2015 |
| JP | 5785329 B2 | 9/2015 |
| KR | 10-2006-0081693 A | 7/2006 |
| KR | 10-2006-0135465 A | 12/2006 |
| KR | 10-2009-0079927 A | 7/2009 |
| KR | 10-2009-0114453 A | 11/2009 |
| KR | 10-2011-0025657 A | 3/2011 |
| KR | 10-2014-0057408 A | 5/2014 |
| KR | 10-2015-0023948 A | 3/2015 |
| MY | 151851 A | 7/2014 |
| RU | 2009117448 A | 11/2010 |
| SG | 175641 A1 | 11/2011 |
| TW | 200520578 A | 6/2005 |
| TW | 200822771 A | 5/2008 |
| TW | 201408112 A | 2/2014 |
| TW | 201616905 A | 5/2016 |
| WO | 2005/018144 A1 | 2/2005 |
| WO | 2006/137720 A2 | 12/2006 |
| WO | 2008/045471 A2 | 4/2008 |
| WO | 2009/157901 A1 | 12/2009 |
| WO | 2014/014094 A1 | 1/2014 |
| WO | 2015/146204 A1 | 10/2015 |

OTHER PUBLICATIONS

Extended European Search Report of EP Patent Application No. 16861850.2, dated Oct. 5, 2018, 15 pages.

Sakoda, et al., "Overall Protocol of UL MU BA for Multicast Transmission", IEEE 802.11-15/1043r0, Sep. 14, 2015, 27 pages.

Yusuke Tanaka, "Overall Protocol of UL MUBA for Multicast Transmission", Sony Corporation, IEEE 802.11-15/1043r0, XP068098226, Sep. 2015, 27 pages.

Extended European Search Report of EP Application No. 20155900.2, dated Mar. 10, 2020, 07 pages.

Office Action for JP Patent Application No. 2017-548668, dated Jul. 7, 2020, 06 pages of Office Action and 05 pages of English Translation.

* cited by examiner

FIG. 3
CHANNEL RESOURCE EXAMPLES WITH SIMULTANEOUS USE OF MULTIPLEXING BY OFDMA AND MU-MIMO
M FREQUENCY RESOURCES FOR OFDMA
N SPATIAL RESOURCES FOR MU-MIMO
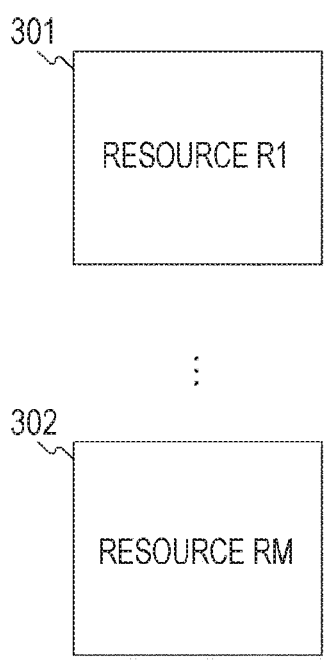
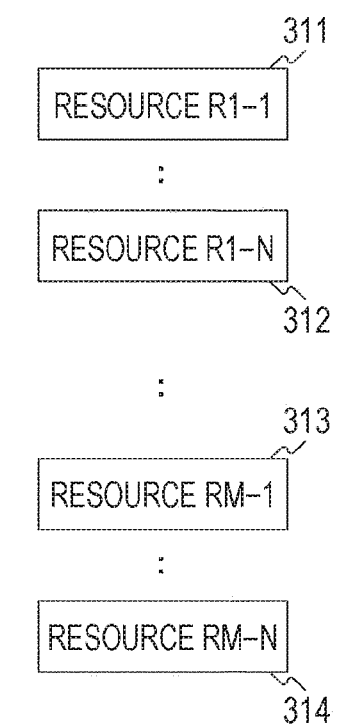

FRAME FORMAT EXAMPLE OF GENERAL PACKET

FRAME FORMAT EXAMPLE OF SIMPLIFIED PACKET

EXAMPLES OF NOTIFICATION OF MU RESOURCE BITMAP ASSIGNMENTS
AND INFORMATION TRANSMISSION BASED ON ASSIGNMENTS

EXAMPLES OF NOTIFICATION OF MU RESOURCE BITMAP ASSIGNMENTS AND INFORMATION TRANSMISSION BASED ON ASSIGNMENTS

EXAMPLES OF NOTIFICATION OF MU RESOURCE BITMAP ASSIGNMENTS AND INFORMATION TRANSMISSION BASED ON ASSIGNMENTS

EXAMPLES OF CHANNEL RESOURCE ASSIGNMENTS
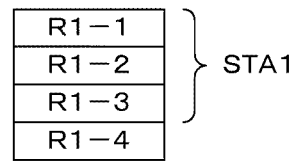
STA1: R1-1, R1-2, R1-3, R1-4
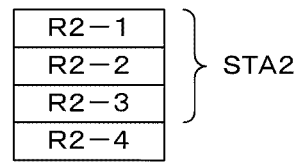
STA2: R2-1, R2-2, R2-3, R2-4
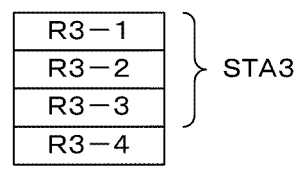
STA3: R3-1, R3-2, R3-3, R3-4
⋮
FIG. 9a
EXAMPLES OF RELATIONSHIPS BETWEEN
CHANNEL RESOURCE ASSIGNMENTS AND PROVIDED INFORMATION
| R1-1<br>R2-1<br>R3-1 | R1-2<br>R2-2<br>R3-2 | R1-3<br>R2-3<br>R3-3 | PER |
|---|---|---|---|
| 0 | 0 | 0 | 0.00 TO 0.01 |
| 0 | 0 | 1 | 0.01 TO 0.02 |
| 0 | 1 | 0 | 0.02 TO 0.03 |
| 0 | 1 | 1 | 0.03 TO 0.05 |
| 1 | 0 | 0 | 0.05 TO 0.10 |
| 1 | 0 | 1 | 0.10 TO 0.30 |
| 1 | 1 | 0 | 0.30 TO 0.50 |
| 1 | 1 | 1 | 0.50 TO 1.00 |
FIG. 9b

EXAMPLES OF CHANNEL RESOURCE ASSIGNMENTS

| R1-1 |
|------|
| R1-2 |
| R1-3 |
| R1-4 |

R1-1 } STA1, Info1 (PER)
R1-2, R1-3 } STA1, Info2 (RSSI)

| R2-1 |
|------|
| R2-2 |
| R2-3 |
| R2-4 |

R2-1 } STA2, Info1 (PER)
R2-2, R2-3 } STA2, Info2 (RSSI)

| R3-1 |
|------|
| R3-2 |
| R3-3 |
| R3-4 |

R3-1 } STA3, Info1 (PER)
R3-2, R3-3 } STA3, Info2 (RSSI)

EXAMPLES OF RELATIONSHIPS BETWEEN
CHANNEL RESOURCE ASSIGNMENTS AND PROVIDED INFORMATION

| R1-1<br>R2-1<br>R3-1 | PER |
|---|---|
| 0 | 0.00 TO 0.10 |
| 1 | 0.10 TO 1.00 |

| R1-2<br>R2-2<br>R3-2 | R1-3<br>R2-3<br>R3-3 | RSSI |
|---|---|---|
| 0 | 0 | −80dBm OR LESS |
| 0 | 1 | −80dBm TO −40dBm |
| 1 | 0 | −40dBm TO 0dBm |
| 1 | 1 | 0dBm OR MORE |

FIG. 10b

EXAMPLES OF CHANNEL RESOURCE ASSIGNMENTS

| R1-1 |
|---|
| R1-2 |
| R1-3 |
| R1-4 |

} STA1, Info1 (PER)
} STA1, Info2 (RSSI)
} STA1, Info3 (PER, Redundant)

| R2-1 |
|---|
| R2-2 |
| R2-3 |
| R2-4 |

} STA2, Info1 (PER)
} STA2, Info2 (RSSI)
} STA2, Info3 (PER, Redundant)

| R3-1 |
|---|
| R3-2 |
| R3-3 |
| R3-4 |

} STA3, Info1 (PER)
} STA3, Info2 (RSSI)
} STA3, Info3 (PER, Redundant)

EXAMPLES OF RELATIONSHIPS BETWEEN
CHANNEL RESOURCE ASSIGNMENTS AND PROVIDED INFORMATION

| R1-1<br>R2-1<br>R3-1 | R1-3<br>R2-3<br>R3-3 | PER |
|---|---|---|
| 0 | 0 | 0.00 TO 0.10 |
| 1 | 1 (Redundant) | 0.10 TO 1.00 |

| R1-2<br>R2-2<br>R3-2 | RSSI |
|---|---|
| 0 | −40dBm OR LESS |
| 1 | −40dBm OR MORE |

FIG. 11b

EXAMPLES OF ASSIGNMENTS OF SAME FREQUENCY OR SPATIAL CHANNEL RESOURCES
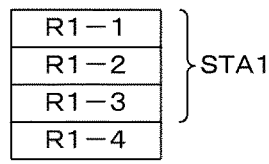
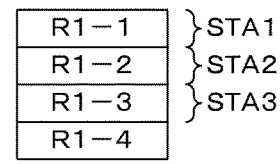
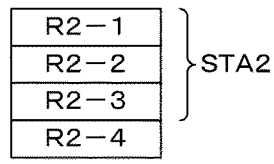
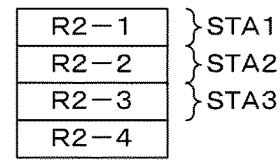
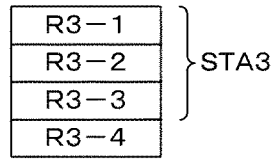
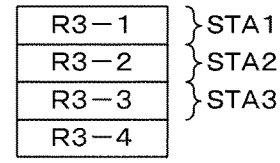
FIG. 12a  FIG. 12b
EXAMPLES OF ASSIGNMENTS OF DIFFERENT FREQUENCY OR SPATIAL CHANNEL RESOURCES
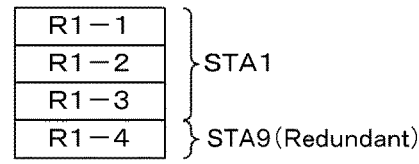
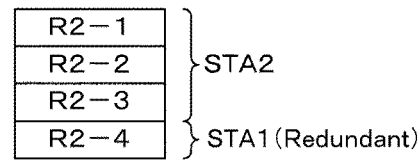
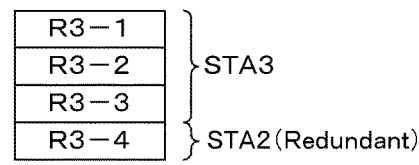
FIG. 12c

OPERATION EXAMPLE OF INFORMATION PROCESSING APPARATUS (AP)

EXAMPLE OF ASSIGNMENTS OF SAME 36 CHANNEL RESOURCES TO STAS AND NOTIFICATION OF ASSIGNMENTS TO STAS

FIG. 16

EXAMPLE OF RELATIONSHIPS AMONG STA TRANSMISSION CONTENTS, AP RECEPTION CONTENTS, AND NACK TRANSMISSION COUNT

| RESOURCE NO. | STA1 TRANSMISSION CONTENTS | STA2 TRANSMISSION CONTENTS | STA3 TRANSMISSION CONTENTS | AP RECEPTION CONTENTS | 1 (= NACK) TRANSMISSION COUNT |
|---|---|---|---|---|---|
| R1-1 | 0 | 0 | 1 | 1 | 1 |
| R1-2 | 0 | 0 | 0 | 0 | 0 |
| R1-3 | 0 | 0 | 1 | 1 | 1 |
| R1-4 | 1 | 1 | 1 | 1 | 3 |
| R2-1 | 0 | 0 | 1 | 1 | 1 |
| R2-2 | 0 | 0 | 0 | 0 | 0 |
| ... | ... | ... | ... | ... | ... |
| R9-3 | 1 | 1 | 1 | 1 | 3 |
| R9-4 | 0 | 0 | 1 | 1 | 1 |

OPERATION EXAMPLE OF INFORMATION PROCESSING APPARATUS (AP)

CHANNEL RESOURCE ASSIGNMENT EXAMPLE

FRAME FORMAT EXAMPLE OF BEACON

NOTIFICATION EXAMPLE OF
PVB (MU-PVB) USING MU RESOURCE BITMAP

INFORMATION PROCESSING APPARATUS AND COMMUNICATION SYSTEM

CROSS REFERENCE TO RELATED APPLICATIONS

This application is a U.S. National Phase of International Patent Application No. PCT/JP2016/077799 filed on Sep. 21, 2016, which claims priority benefit of Japanese Patent Application No. JP 2015-215389 filed in the Japan Patent Office on Nov. 2, 2015. Each of the above-referenced applications is hereby incorporated herein by reference in its entirety.

TECHNICAL FIELD

The present technology relates to an information processing apparatus, more specifically to an information processing apparatus and a communication system that exchange information via wireless communications.

BACKGROUND ART

There have been conventionally wireless communication technologies by which information is exchanged via wireless communications. In addition, in recent years, there have been wireless communication technologies for distributing the same data simultaneously to a plurality of wireless devices.

For example, there is service of distributing the same information (for example, video or sound) steadily at places with a large number of users (for example, restaurants, public transportations, sports stadiums, and educational facilities). Such a technology for transmitting the same data simultaneously to a plurality of destinations is called multicast.

In wireless communications, in general, a device as a data source preferably ascertains whether transmission data has been correctly transmitted to a device as a data destination, and in a case where the data has not been correctly transmitted, the device as a data source preferably re-transmits the data. With this arrangement, it is possible to keep communication quality. For example, it is assumed that devices having a wireless LAN function under the standard Institute of Electrical and Electronic Engineers (IEEE) 802.11 exchange data with each other. In this case, a source device ascertains whether transmission data has been correctly transmitted by checking if a delivery acknowledgment (Ack/Block Ack (BA)) is returned from a destination device in response to the transmission data. For reference, the source device is a base station (access point (AP)), for example. In addition, the destination device is a slave machine (station (STA)), for example.

According to multicast, however, data is transmitted to a plurality of devices, and when a delivery acknowledgement is requested to each of the devices, many communications are required for the transmission of the delivery acknowledgements, thereby leading to increased overhead. Particularly in an environment where a plurality of devices transmits and receives data, the overhead for improvement of communication quality consumes communication resources, which may cause degradation of communication quality. In addition, in a case where the delay time required by the handling traffic is short, large numbers of delivery acknowledgements and re-transmissions may exceed the required delay time.

In addition, in a case where an STA is in substantially poor data reception status, the data is repeatedly re-transmitted to the STA, which may deteriorate the characteristics of the overall system. Accordingly, the AP needs to collect in advance information regarding the reception status from the individual STAs and determine properly to which of the STAs the delivery acknowledgement is to be requested. However, the overhead for collecting the information regarding the reception status may also consume resources and degrade the communication quality.

Accordingly, there have been proposed technologies for improving the communication quality of multicast. For example, there has been proposed a distribution system in which the clients to receive multicasted data are grouped, a representative client is selected in each of the groups, and delivery acknowledgements are received from the representative clients (for example, refer to Patent Document 1). In the distribution system, clients more likely to fail to receive data are selected as representative clients.

CITATION LIST

Patent Document

Patent Document 1: Japanese Patent Application Laid-Open No. 2014-53832

SUMMARY OF THE INVENTION

Problems to be Solved by the Invention

According to the foregoing conventional technology, no delivery acknowledgements are received from clients like the representative clients in correlation between the data that could not be received. However, the representative clients transmit the delivery acknowledgements as usual and thus there exists overhead. In addition, the overhead cannot be reduced in an environment with many representative clients. Accordingly, it is important to reduce the overhead and enhance the communication quality to perform wireless communications in a proper manner.

The present technology is devised in view of such circumstances and is intended to perform wireless communications in a proper manner.

Solutions to Problems

The present technology is devised to solve the foregoing problems. A first aspect of the present technology is an information processing apparatus including a control unit that performs a control to assign a plurality of channel resources for wireless communications to a plurality of devices and notify the plurality of devices of the assignments, an information processing method, and a program for causing a computer to execute the information processing method. With this arrangement, it is possible to produce the advantageous effect of assigning a plurality of channel resources to a plurality of devices and notifying the plurality of devices of the assignments.

In addition, in the first aspect, the information processing apparatus may further include a communication unit configured to receive signals transmitted by the devices by using the plurality of channel resources assigned to the devices, on each of the plurality of channel resources, in which the control unit may acquire one or more pieces of information formed by the plurality of signals received on each of the plurality of channel resources. With this arrangement, it is possible to produce the advantageous effect of acquiring one or more pieces of information including a plurality of signals received by a plurality of channel resources.

In addition, in the first aspect, the control unit may perform a control to provide information regarding a transmission condition to the plurality of devices, and cause the plurality of devices to transmit the signals on the basis of the provided information. With this arrangement, it is possible to produce the advantageous effect of providing information regarding a transmission condition to a plurality of devices and causing the plurality of devices to transmit signals on the basis of the provided information.

In addition, in the first aspect, the plurality of channel resources may include combinations of frequency channel resources and spatial channel resources. With this arrangement, it is possible to produce the advantageous effect of using a plurality of channel resources including combinations of frequency channel resources and spatial channel resources.

In addition, in the first aspect, the control unit may perform a control to notify that signals in a simplified frame format are transmitted by using the assigned channel resources. With this arrangement, it is possible to produce the advantageous effect of providing notification of transmission of signals in a simplified frame format using assigned channel resources.

In addition, in the first aspect, the control unit may perform a control to assign two or more channel resources to each of the devices constituting the plurality of devices. With this arrangement, it is possible to produce the advantageous effect of assigning two or more channel resources to each of plurality of devices.

In addition, in the first aspect, the control unit may perform a control to notify the plurality of devices that signals for providing one or more pieces of information to the information processing apparatus are transmitted by using the two or more channel resources. With this arrangement, it is possible to produce the advantageous effect of notifying a plurality of devices about the transmission of signals for providing one or more pieces of information to an information processing apparatus, using two or more channel resources.

In addition, in the first aspect, the control unit may perform a control to notify the plurality of devices that signals for providing same information to the information processing apparatus are transmitted by using different channel resources. With this arrangement, it is possible to produce the advantageous effect of notifying a plurality of devices about the transmission of signal for providing the same information to an information processing apparatus, using different channel resources.

In addition, in the first aspect, the control unit may perform a control to assign same frequency channel resources or same spatial channel resources as the two or more channel resources. With this arrangement, it is possible to produce the advantageous effect of assigning the same frequency channel resources or the same spatial channel resources as two or more channel resources.

In addition, in the first aspect, the control unit may perform a control to cause the devices to transmit information regarding reception status of the devices as the one or more pieces of information. With this arrangement, it is possible to produce the advantageous effect of transmitting information regarding the reception status of devices as one or more pieces of information.

In addition, in the first aspect, the control unit may perform a control to assign the two or more same channel resources of the plurality of channel resources to each of the plurality of devices. With this arrangement, it is possible to produce the advantageous effect of assigning the same two or more channel resources out of a plurality of channel resources to each of a plurality of devices.

In addition, in the first aspect, on the basis of reception power of signals transmitted by using the same channel resources, the control unit may determine a number of devices, out of the plurality of devices, that have transmitted the signals. With this arrangement, it is possible to produce the advantageous effect of, on the basis of reception power of signals transmitted using the same channel resource, determining the number of devices having transmitted the signals, out of a plurality of devices.

In addition, in the first aspect, the control unit may perform a control to cause the plurality of devices to transmit signals for providing notification of results of reception of multicast transmission to the plurality of devices by using the same channel resources. With this arrangement, it is possible to produce the advantageous effect of transmitting signals for providing notification of reception results in response to multicast transmission to a plurality of devices, using the same channel resource.

In addition, in the first aspect, the control unit may perform a control to assign some of the plurality of channel resources to two or more devices constituting the plurality of devices, and assign others of the channel resources independently to the plurality of devices. With this arrangement, it is possible to produce the advantageous effect of assigning some of a plurality of channel resources to two or more devices and assigning others of the plurality of channel resources independently to a plurality of devices.

In addition, in the first aspect, the control unit may perform a control to provide information necessary for the devices to transmit signals by using the plurality of assigned channel resources. With this arrangement, it is possible to produce the advantageous effect of providing information necessary for devices to transmit signals using a plurality of assigned channel resources.

In addition, a second aspect of the present technology is an information processing apparatus including a control unit that performs a control to transmit a plurality of signals to a plurality of devices using a plurality of channel resources for wireless communications to provide one or more pieces of information including the plurality of signals to the plurality of devices, an information processing method, and a program for causing a computer to execute the information processing method. With this arrangement, it is possible to produce the advantageous effect of transmitting a plurality of signals to a plurality of devices using a plurality of channel resources to provide one or more pieces of information including the plurality of signals to the plurality of devices.

In addition, in the second aspect, the control unit may provide information regarding the devices on which data is accumulated in the information processing apparatus by using the one or more pieces of information. With this arrangement, it is possible to produce the advantageous effect of providing information regarding devices on which data is accumulated in an information processing apparatus, using one or more pieces of information.

In addition, a third aspect of the present technology is an information processing apparatus including a control unit that performs a control to, upon receipt of a notification that a plurality of channel resources for wireless communications is assigned to the information processing apparatus, transmit to other devices a plurality of signals for providing predetermined information to the other devices using the plurality of assigned channel resources, an information processing method, and a program for causing a computer to execute the information processing method. With this arrangement, it is possible to produce the advantageous effect of, upon receipt of a notification that a plurality of channel resources is assigned to the subject apparatus, transmitting to other devices a plurality of signals for providing predetermined information to the other devices, using the plurality of assigned channel resources.

In addition, in this third aspect, the control unit may perform a control to transmit signals in a simplified frame format by using the plurality of assigned channel resources. With this arrangement, it is possible to produce the advantageous effect of transmitting a signal in a simplified frame format using a plurality of assigned channel resources.

In addition, a fourth aspect of the present technology is a communication system including a first information processing apparatus that assigns a plurality of channel resources for wireless communications to a plurality of second information processing apparatuses and notifies the plurality of second information processing apparatuses of the assignments, and the second information processing apparatuses that, upon receipt of the notification, transmit to the first information processing apparatus a plurality of signals for providing predetermined information to the first information processing apparatus using the plurality of assigned channel resources, an information processing method, and a program for causing a computer to execute the information processing method. With this arrangement, it is possible to produce the advantageous effect of causing a first information processing apparatus to assign a plurality of channel resources to a plurality of second information processing apparatuses and notify the plurality of second information processing apparatuses of the assignments, and causing the second information processing apparatuses to, upon receipt of the notification, transmit to the first information processing apparatus a plurality of signals for providing predetermined information to the first information processing apparatus using the plurality of assigned channel resources.

Effects of the Invention

The present technology can produce the advantage effect of performing proper wireless communications. For reference, this advantage effect is not necessarily limited but may be any of the advantage effects described in the present disclosure.

BRIEF DESCRIPTION OF DRAWINGS

FIG. 3 is a diagram schematically illustrating channel resources used by devices constituting the communication system 10 according to the first embodiment of the present technology.

FIGS. 9a and 9b are diagrams illustrating an example of channel resources assigned to the information processing apparatuses (STAs) and information provided by the information processing apparatuses (STAs) to the information processing apparatus (AP) 100 according to the first embodiment of the present technology.

FIGS. 10a and 10b are diagrams illustrating an example of channel resources assigned to the information processing apparatuses (STAs) and information provided by the information processing apparatuses (STAs) to the information processing apparatus (AP) 100 according to the first embodiment of the present technology.

FIGS. 11a and 11b are diagrams illustrating an example of channel resources assigned to the information processing apparatuses (STAs) and information provided by the information processing apparatuses (STAs) to the information processing apparatus (AP) 100 according to the first embodiment of the present technology.

FIGS. 12a, 12b, and 12c are diagrams illustrating another example of channel resources assigned to the information processing apparatuses (STAs) according to the first embodiment of the present technology.

FIG. 16 is a diagram illustrating an example of relationships among contents transmitted by the information processing apparatuses (STAs), contents received by the information processing apparatus (AP) 100, and the number of NACK transmissions by the information processing apparatuses (STAs) according to the second embodiment of the present technology.

MODE FOR CARRYING OUT THE INVENTION

Modes for carrying out the present technology (hereinafter, referred to as embodiments) will be described below. The descriptions will be given in the following order:

1. First embodiment (an example in which the information processing apparatus (AP) assigns two or more channel resources to one information processing apparatus (STA) and provides notification of the assignment thereto)

2. Second embodiment (an example in which the same channel resource is assigned to two or more information processing apparatuses (STAs) and notification of the assignment is provided thereto)

3. Third embodiment (an example in which some of a plurality of channel resources are equally assigned to two or more information processing apparatuses (STAs) and other of the plurality of channel resources are independently assigned to each of the information processing apparatuses (STAs) and notification of the assignment is provided thereto)

4. Fourth embodiment (an example in which the information processing apparatus (AP) provides information to the information processing apparatuses (STAs) using an MU resource bitmap)

5. Application examples

1. First Embodiment

[Configuration Example of a Communication System]

Figure 1:
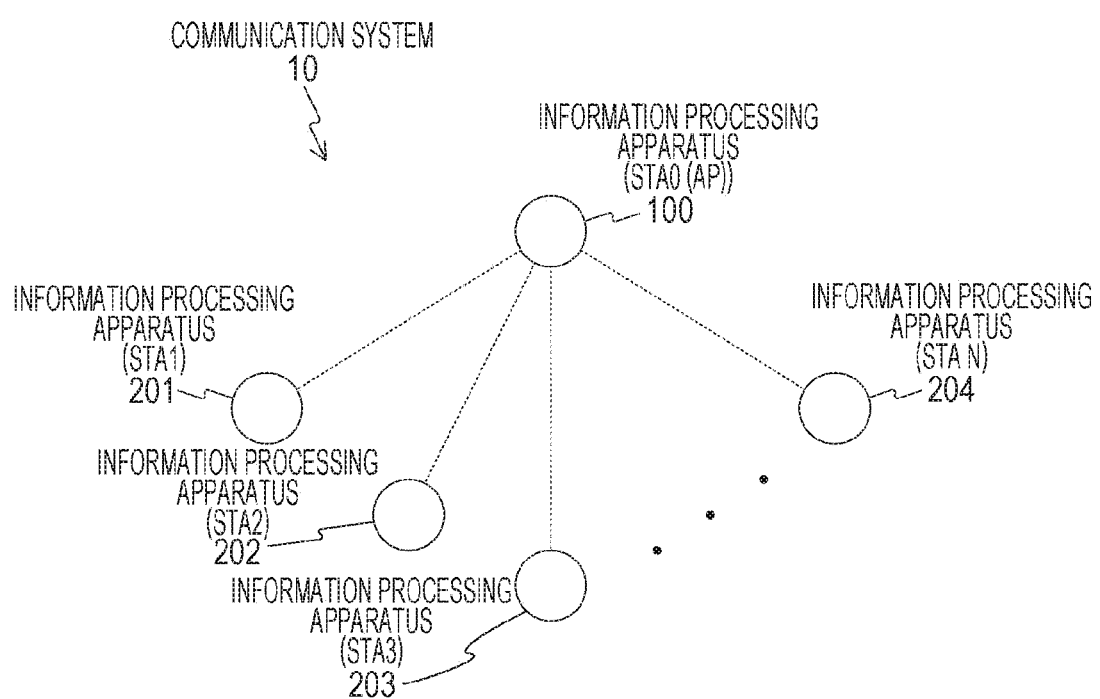
FIG. 1 is a diagram illustrating a configuration example of a communication system 10 according to a first embodiment of the present technology.

FIG. 1 is a diagram illustrating a configuration example of a communication system 10 according to a first embodiment of the present technology.

FIG. 1 illustrates an example of a case where there exist N+1 information processing apparatus (STA0) 100 and information processing apparatuses (STA1) 201 to (STA N) 204, and one of these apparatuses connects to the other N devices. Specifically, FIG. 1 illustrates an example of a case where the information processing apparatus (STA 0 (AP)) 100 connects to the information processing apparatuses (STA1) 201 to (STA N) 204. In addition, the connected information processing apparatuses can be regarded as devices belonging to a group receiving the same multicast data.

For example, the information processing apparatus (STA0) can be set as a base station (access point (AP)). Accordingly, the information processing apparatus (STA0) will be hereinafter also referred to as information processing apparatus (STA0 (AP)), information processing apparatus (AP), AP, and the like. In addition, the information processing apparatuses (STA1) 201 to (STA N)) 204 connected to the information processing apparatus (STA0 (AP)) 100 can be set as slave machines (stations (STAs)) belonging to the same multicast group.

For reference, FIG. 1 illustrates examples of communication paths for direct communications between devices via wireless communications with dotted lines.

In addition, for example, the information processing apparatus (STA0 (AP)) 100 and the information processing apparatuses (STA1) 201 to (STA N)) 204 can be set as stationary or portable information processing apparatuses with a wireless communication function. Here, the stationary information processing apparatus is an access point or a base station in a wireless local area network (LAN) system or the like, for example. In addition, the portable information processing apparatus is a smartphone, a cellular phone, a tablet terminal, or the like, for example.

In addition, the information processing apparatus (STA0 (AP)) 100 and the information processing apparatuses (STA1) 201 to (STA N)) 204 include a communication function in conformity with wireless LAN standards, for example, such as Institute of Electrical and Electronic Engineers (IEEE) 802.11. In addition, these information processing apparatuses can have a communication function in conformity with the wireless LAN standards IEEE 802.11ax, for example. Furthermore, the wireless LAN may conform to Wireless Fidelity (Wi-Fi), Wi-Fi Direct, Wi-Fi CERTIFIED Miracast specifications (technical specification name: Wi-Fi Display), for example. Alternatively, wireless communications may be performed using another communication scheme.

For example, the communication system 10 is applicable to a network in which a plurality of devices performs one-on-one wireless communications to connect with each other (for example, meshed network or ad-hoc network). For example, the communication system 10 is applicable to an IEEE802.11s meshed network.

For reference, in relation to the embodiment of the present technology, operations of a source device (transmitting device) and a destination device (receiving device) are separately described for the sake of convenience. However, each of the devices may have both or either one of the functions.

In addition, the system configuration targeted in the embodiment of the present technology is not limited to the foregoing ones. For example, FIG. 1 illustrates an example of a communication system including 1+N information processing apparatuses, but the number of the information processing apparatuses is not limited to this. In addition, the connection form of a plurality of information processing apparatuses is not limited to the foregoing ones. For example, the embodiment of the present technology is also applicable to a network in which a plurality of devices is connected in a connection form other than the foregoing ones. For example, in a communication system in which an information processing apparatus can communicate with a plurality of connected information processing apparatuses, the number of the information processing apparatuses is not limited to the foregoing ones.

[Functional Configuration Example of the Information Processing Apparatuses (AP and STAB)]

Figure 2:
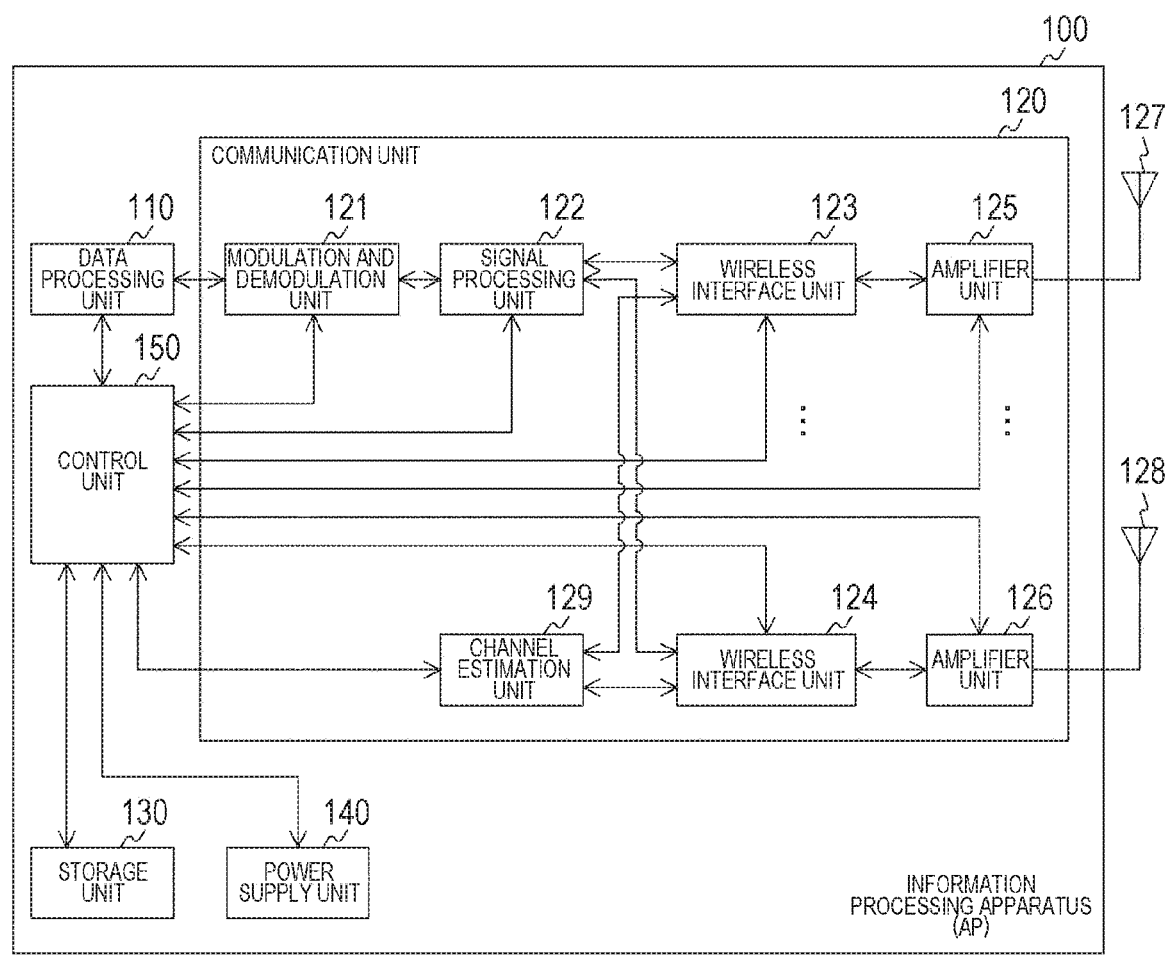
FIG. 2 is a block diagram illustrating a functional configuration example of an information processing apparatus (AP) 100 according to the first embodiment of the present technology.

FIG. 2 is a block diagram illustrating a functional configuration example of the information processing apparatus (AP) 100 according to the first embodiment of the present technology. For reference, the functional configuration of the information processing apparatuses (STA1) 201 to (STA N)) 204 (wireless communication-related configuration) illustrated in FIG. 1 is almost similar to the functional configuration of the information processing apparatus (AP) 100.

The information processing apparatus (AP) 100 includes a data processing unit 110, a communication unit 120, a storage unit 130, a power supply unit 140, and a control unit 150. Furthermore, the communication unit 120 includes a modulation and demodulation unit 121, a signal processing unit 122, wireless interface units 123 and 124, amplifier units 125 and 126, antennas 127 and 128, and a channel estimation unit 129. In addition, the communication unit 120 can perform communications by orthogonal frequency-division multiple access (OFDMA) and multi user multiple input multiple output (MU-MIMO).

The data processing unit 110 processes various data under the control of the control unit 150. At a transmission time when data is input from a higher-level layer, for example, the data processing unit 110 generates a packet for wireless transmission from the data. The data processing unit 110 then performs processes such as adding a header for media access control (MAC) and adding an error detection code, and provides the processed data to the modulation and demodulation unit 121. In addition, at a reception time when data is input from the modulation and demodulation unit 121, for example, the data processing unit 110 performs processes such as analyzing the MAC header, detecting a packet error, and reordering, and provides the processed data to a protocol higher-level layer in the subject apparatus. The data processing unit 110 also notifies the control unit 150 of the result of header analysis, the result of packet error detection, and others, for example.

The modulation and demodulation unit 121 performs a modulation and demodulation process under the control of the control unit 150. At a transmission time, for example, the modulation and demodulation unit 121 performs encoding, interleaving, and demodulation on the input data from the data processing unit 110, according to the coding and modulation methods set by the control unit 150. The modulation and demodulation unit 121 then generates a data symbol stream and provides the same to the signal processing unit 122. In addition, at a reception time, for example, the modulation and demodulation unit 121 performs the opposite of the processes at the transmission time on the input data from the signal processing unit 122, and provides the processed data to the data processing unit 110 or the control unit 150.

The signal processing unit 122 performs various signal processes (for example, spatial signal process) under the control of the control unit 150. At a transmission time, for example, the signal processing unit 122 performs a signal process for spatial separation (spatial signal process) as necessary on the input data from the modulation and demodulation unit 121, and provides one or more obtained transmission symbol streams to the wireless interface units 123 and 124. In addition, at a reception time, for example, the signal processing unit 122 performs a signal process on the reception symbol streams input from the wireless interface units 123 and 124, performs spatial separation on the streams as necessary, and provides the processed data to the modulation and demodulation unit 121.

The wireless interface units 123 and 124 are interfaces for connecting to other information processing apparatuses via wireless communications to transmit and receive various kinds of information. At a transmission time, for example, the wireless interface units 123 and 124 convert the input data from the signal processing unit 122 into analog signals and subject the signals to filtering and up-converting into carrier frequencies. Then, the wireless interface units 123 and 124 send the analog signals from the antennas 127 and 128 via the amplifier units 125 and 126. In addition, at a reception time, for example, the wireless interface units 123 and 124 perform the opposite of the processes at the transmission time on the input data from the antennas 127 and 128 or the amplifier units 125 and 126, and provide the processed data to the signal processing unit 122 and the channel estimation unit 129.

The amplifier units 125 and 126 are amplifiers that amplify analog signals to predetermined power. At a transmission time, for example, the amplifier units 125 and 126 amplify the analog signals input from the wireless interface units 123 and 124 to predetermined power, and send the analog signals from the antennas 127 and 128. In addition, at a reception time, for example, the amplifier units 125 and 126 amplify the signals input from the antennas 127 and 128 to predetermined power, and outputs the same to the wireless interface units 123 and 124.

For reference, FIG. 2 illustrates the amplifier units 125 and 126 and the wireless interface units 123 and 124 in different configurations. However, the amplifier units 125 and 126 may be configured such that at least one of the transmission function and the reception function is included in the wireless interface units 123 and 124.

In addition, FIG. 2 illustrates an example of a case where there exists a plurality of sets of the wireless interface unit 123, the amplifier unit 125, and the antenna 127, and a plurality of sets of the wireless interface unit 124, the amplifier unit 126, and the antenna 128. However, there may exist only one set of the wireless interface unit, the amplifier unit, and the antenna.

The channel estimation unit 129 calculates complex channel gain information regarding propagation channels from preamble portions and training signal portions of the input signals from the wireless interface units 123 and 124. Then, the calculated complex channel gain information is used via the control unit 150 in the demodulation process by the modulation and demodulation unit 121 and the spatial process by the signal processing unit 122.

The storage unit 130 plays the role of a working area for data processing by the control unit 150 and has the function of a storage medium holding various data. The storage unit 130 may be a storage medium such as a non-volatile memory, a magnetic disc, an optical disc, or a magneto optical (MO) disc, for example. For reference, the non-volatile memory may be an electrically erasable programmable read-only memory (EEPROM), or an erasable programmable ROM (EPROM), for example. In addition, the magnetic disc may be a hard disc or a disc-shaped magnetic disc, for example. In addition, the optical disc may be a compact disc (CD), a digital versatile disc recordable (DVD-R), a Blu-Ray (BD) disc (registered trademark), for example.

The power supply unit 140 supplies power to the components of the information processing apparatus (AP) 100 under the control of the control unit 150. In a case where the information processing apparatus (AP) 100 is a stationary device, for example, the power supply unit 140 includes a stationary power supply. In addition, in a case where the information processing apparatus (AP) 100 is a portable device (for example, mobile device), for example, the power supply unit 140 includes a battery power supply.

The control unit 150 controls the receiving operations and transmitting operations of the components of the information processing apparatus (AP) 100 under the control program. For example, the control unit 150 allows exchange of information between the components of the information processing apparatus (AP) 100. In addition, for example, the control unit 150 sets parameters in the modulation and demodulation unit 121 and the signal processing unit 122 and schedules for packets in the data processing unit 110. In addition, for example, the control unit 150 sets parameters in the wireless interface units 123 and 124 and the amplifier units 125 and 126 and controls transmission power of the wireless interface units 123 and 124 and the amplifier units 125 and 126.

In addition, for example, the control unit 150 performs a control for communications by OFDMA and MU-MIMO, for example. In addition, for example, the control unit 150 transmits a simplified frame format, determines channel resource assignments, provides notification of the assignments, and performs a control for communications according to the assignments.

[Channel Resource Examples with Simultaneous Use of Multiplexing by OFDMA and MU-MIMO]

FIG. 3 is a diagram schematically illustrating channel resources used by devices constituting the communication system 10 according to the first embodiment of the present technology.

FIG. 3 illustrates M frequency resources (resources R1 (301) to RM (302)) for OFDMA on the left side. FIG. 3 also illustrates N spatial resources for MU-MIMO on the right side.

As illustrated in FIG. 3, the total M×N channel resources can be provided by combining OFDMA with the M frequency resources and MU-MIMO with the N spatial resources. That is, resources R1-1 (311) to RM-N (314) can be provided.

In addition, FIG. 3 illustrates the individual channel resources with identification information (R1-1, . . . , R1-N, . . . , RM-1, . . . , RM-N) for the ease of explanation.

[Frame Format Examples of Packets]

Figure 4A:
FIGS. 4a and 4b are diagrams schematically illustrating frame format examples of packets exchanged by the devices constituting the communication system 10 according to the first embodiment of the present technology.
Figure 4B:
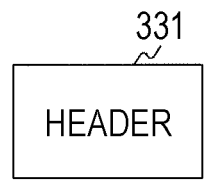

FIGS. 4a and 4b are diagrams schematically illustrating frame format examples of packets exchanged by the devices constituting the communication system 10 according to the first embodiment of the present technology.

A frame format example for a general packet is illustrated in FIG. 4a. The packet illustrated in FIG. 4a includes a header 321 and a payload 322, for example.

A frame format example obtained by simplifying a frame format of a general packet is illustrated in FIG. 4b. The packet illustrated in FIG. 4b is obtained by simplifying a general frame format and includes only a header 331, for example. As described above, FIG. 4b illustrates a configuration example of a frame in which only a very small amount of information (for example, one or several bits) can be expressed.

Here, in a case of storing one bit in the packet (the header 331) illustrated in FIG. 4b, a field for actually storing 0/1 can be used, for example. In addition, a known coding pattern may express 0/1. For reference, these are mere examples, and any differently configured packet may be used, and information may be transferred by any other information transfer means (for example, power intensity).

For example, in an information processing apparatus that allows the simultaneous use of multiplexing by OFDMA and MU-MIMO, it is assumed that the frame illustrated in FIG. 4b (obtained by simplifying a general frame format) is formed. In this case, the combinations of channel resources and frame format make it possible to communicate with a plurality of information processing apparatuses to transmit a small amount of information with small overhead.

That is, the combinations of the plurality of channel resources illustrated in FIG. 3 and the simplified frame format illustrated in FIG. 4b make it possible to communicate with a plurality of information processing apparatuses to transmit a small amount of information with small overhead. For reference, in the embodiment of the present technology, these combinations will be described as MU resource bitmap.

In addition, in the first embodiment of the present technology, the information processing apparatus (AP) 100 assigns two or more channel resources to one information processing apparatus (STA) and notifies the information processing apparatus of the assignment.

Here, as described above, the MU resource bitmap includes total M×N resources R1-1 to RM-N at a maximum. In the first embodiment of the present technology, however, total 36 resources with M=9 and N=4 exist as an example, for the ease of explanation.

In addition, FIGS. 5 to 8 illustrate examples in which the information processing apparatus (AP) 100 assigns the MU resource bitmap to the information processing apparatuses (STA1) 201 to (STA3) 203. FIGS. 5 to 8 also illustrate examples in which the information processing apparatuses (STA1) 201 to (STA3) 203 transmit information to the information processing apparatus (AP) 100 according to the assignments. In addition, FIGS. 5 to 8 illustrate examples in which three each channel resources are assigned to the three information processing apparatuses (STA1) 201 to (STA3) 203.

[Examples of Notification of MU Resource Bitmap Assignments and Information Transmission Based on the Assignments]

FIGS. 5 to 8 are sequence diagrams illustrating examples of notification of the MU resource bitmap assignments by the information processing apparatus (AP) 100 and information transmission by the information processing apparatuses (STA1) 201 to (STA3) 203 according to the first embodiment of the present technology.

FIGS. 5 to 8 illustrate examples of a case where the information processing apparatuses (STA1) 201 to (STA3) 203 multiplex information requested by the information processing apparatus (AP) 100 and transmit the same to the information processing apparatus (AP) 100. For reference, the horizontal axes illustrated in FIGS. 5 to 8 represent time axes. In addition, FIGS. 5 to 8 illustrate the data transmitted from the devices in rectangles above the time axes corresponding to the devices. For reference, the rectangles contain the data name or the identification information of the channel resources used.

Here, in the first embodiment of the present technology, the bandwidth is set to 20 MHz, which is divided into a maximum of nine sub channels by OFDMA, as an example. In addition, FIGS. 5 to 8 illustrate examples in which the bandwidth of 20 MHz is divided into three or more by OFDMA, and three of the divided frequency resources are assigned to the information processing apparatuses (STA1) 201 to (STA3) 203. Furthermore, FIGS. 5 to 8 illustrate examples in which three spatial resources are assigned by MU-MIMO for one frequency resource.

Figure 5:
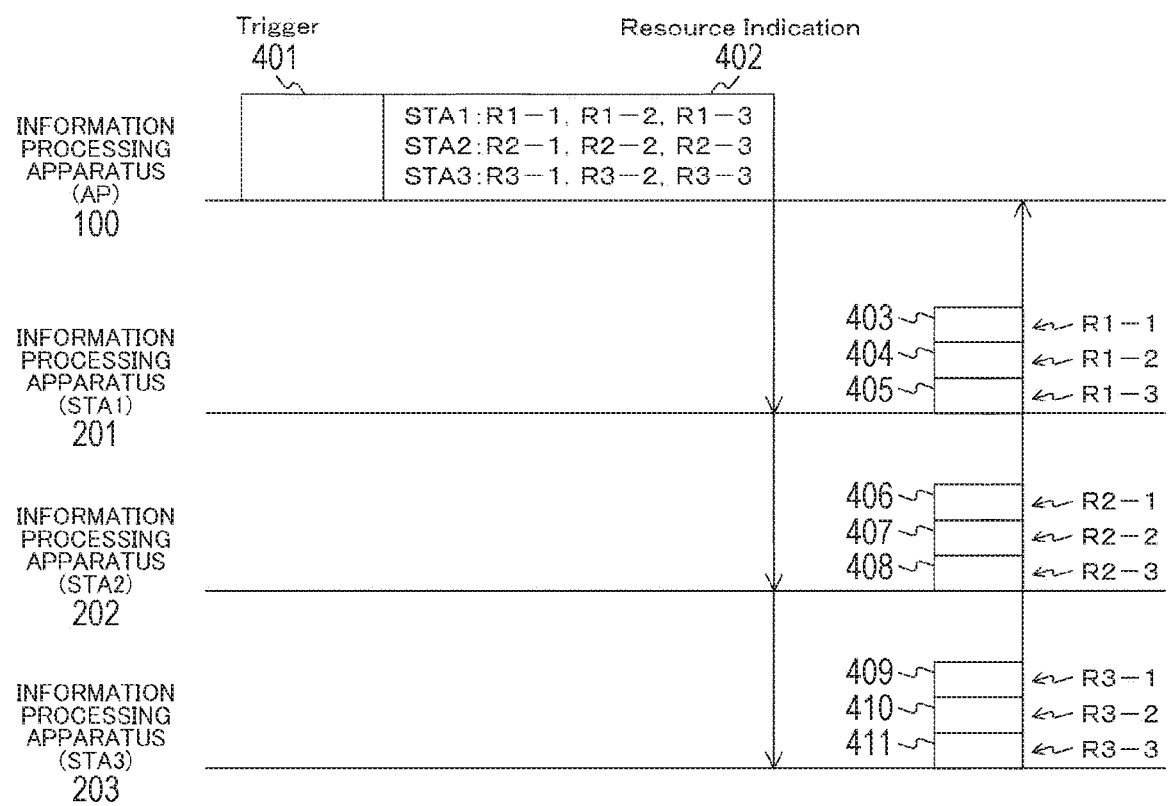
FIG. 5 is a sequence diagram illustrating an example of notification of MU resource bitmap assignments by the information processing apparatus (AP) 100 and information transmission by information processing apparatuses (STA1) 201 to (STA3) 203 according to the first embodiment of the present technology.

FIG. 5 illustrates an example in which the information processing apparatus (AP) 100 provides information regarding MU resource bitmap assignments (channel resource assignment information (included in the frame 402)) coupled with a trigger frame 401.

The trigger frame 401 here refers to a frame from which uplink multiplexing transmission is started. In addition, the trigger frame 401 includes information to be transmitted by the information processing apparatuses (STA1) 201 to (STA3) 203 in uplink multiplexing transmission and other instructions for a transmission method (for example, modulation encoding scheme, transmission power, time (transmission timing)).

The multiplexing transmission here means that a plurality of signals (data) is collected and transmitted in one or more shared transmission paths. In addition, the multiplexing transmission is also called multiplexed transmission, multiplex transmission, or multiplex communication. For example, a method for transmitting data from the plurality of information processing apparatuses (STAs) at the same timing to the one information processing apparatus (AP) 100 can be regarded as uplink multiplexed transmission to the information processing apparatus (AP) 100.

In addition, FIG. 5 illustrates an example of providing the channel resource assignment information in which the channel resource assignment information stored in the single frame 402 is transmitted in such a manner that the information processing apparatuses (STA1) 201 to (STA3) 203 can receive the frame 402. For example, the frame 402 can be transmitted to a group of the information processing apparatuses (STA1) 201 to (STA3) 203 to receive the frame 402 as the destination of the frame 402.

Specifically, the information processing apparatus (AP) 100 couples the channel resource assignment information (included in the frame 402) to the trigger frame 401 to have a coupled frame. Then, the information processing apparatus (AP) 100 transmits the coupled frame of the channel resource assignment information and the trigger frame 401 to the information processing apparatuses (STA1) 201 to (STA3) 203.

Here, the coupled frame can be transmitted in such a manner that a plurality of information processing apparatuses can receive. For example, the coupled frame can be transmitted by OFDMA, multi user multiple input multiple output (MU-MIMO), multicast, or broadcast. In addition, the frame format for the coupled frame in this case can be the frame format of general packet illustrated in FIG. 4*a*. In addition, the channel resource assignment information can be recorded in a predetermined area of the payload illustrated in FIG. 4*a*. The predetermined area is set in advance.

In addition, the channel resource assignment information (the information regarding MU resource bitmap assignments) included in the frame 402 is information for specifying the channel resources assigned to the information processing apparatuses (STA1) 201 to (STA3) 203. For example, the channel resource assignment information may include associations between the identification information of the information processing apparatuses (STAs) and the identification information for specifying the channel resources. FIG. 5 illustrates the channel resource assignment information in the frame 402 in a simplified manner.

In addition, upon receipt of the trigger frame 401, the information processing apparatuses (STA1) 201 to (STA3) 203 perform uplink multiplexing transmission, on the basis of the information included in the received trigger frame 401. For example, the information processing apparatuses (STA1) 201 to (STA3) 203 perform the uplink multiplexing transmission of information 403 to 411, on the basis of the information regarding the uplink multiplexing transmission (for example, modulation encoding scheme, transmission power, and time (transmission timing)).

In addition, upon receipt of the frame 402, the information processing apparatuses (STA1) 201 to (STA3) 203 perform uplink multiplexing transmission by using the channel resources notification of which is provided, on the basis of the channel resource assignment information included in the received frame 402. For example, the information processing apparatus (STA1) 201 performs the uplink multiplexing transmission of the information 403 to 405 by using the channel resources R1-1 to R1-3 notification of which is provided. In addition, the information processing apparatus (STA2) 202 performs the uplink multiplexing transmission of the information 406 to 408 by using the channel resources R2-1 to R2-3 notification of which is provided. In addition, the information processing apparatus (STA3) 203 performs the uplink multiplexing transmission of the information 409 to 411 by using the channel resources R3-1 to R3-3 notification of which is provided.

FIGS. 5 to 8 illustrate the identification information R1-1 to R3-3 of the channel resources for use in the transmission, next to the rectangles indicating the information 403 to 411. For reference, the contents of the information 403 to 411 will be described later in detail with reference to FIGS. 9*a*, 9*b*, 10*a*, 10*b*, 11*a*, and 11*b*.

For reference, FIG. 5 illustrates an example in which a coupled frame of the frame 402 (including the channel resource assignment information) and the trigger frame 401 is transmitted. Alternatively, the channel resource assignment information may be included in part of the trigger frame 401.

Figure 6:
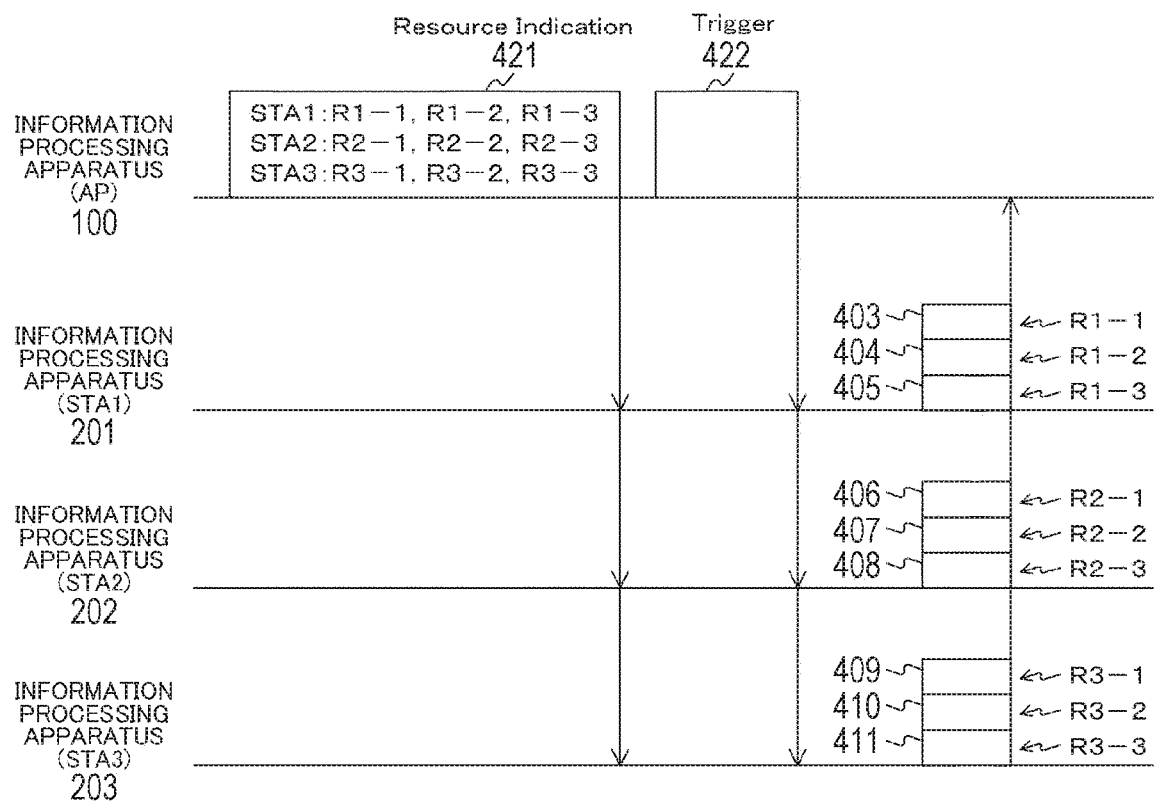
FIG. 6 is a sequence diagram illustrating an example of notification of MU resource bitmap assignments by the information processing apparatus (AP) 100 and information transmission by information processing apparatuses (STA1) 201 to (STA3) 203 according to the first embodiment of the present technology.

FIG. 6 illustrates an example in which the information processing apparatus (AP) 100 provides the channel resource assignment information (included in a frame 421) at a timing different from that for a trigger frame 422. Specifically, FIG. 6 illustrates an example in which the channel resource assignment information is provided prior to the trigger frame 422.

For reference, the frame 421 for providing the channel resource assignment information corresponds to the frame 402 illustrated in FIG. 5, and the trigger frame 422 corresponds to the trigger frame 401 illustrated in FIG. 5. Therefore, detailed descriptions thereof will be omitted here.

Here, the frame 421 for providing the channel resource assignment information may be transmitted singly as illustrated in FIG. 6 or may be transmitted together with another frame (for example, a beacon).

In addition, the frame 421 for providing the channel resource assignment information may include the information regarding the time when the trigger frame 422 will be transmitted (transmission timing). With this arrangement, upon receipt of the frame 421, the information processing apparatuses (STAs) can grasp the transmission timing of the trigger frame 422.

Figure 7:
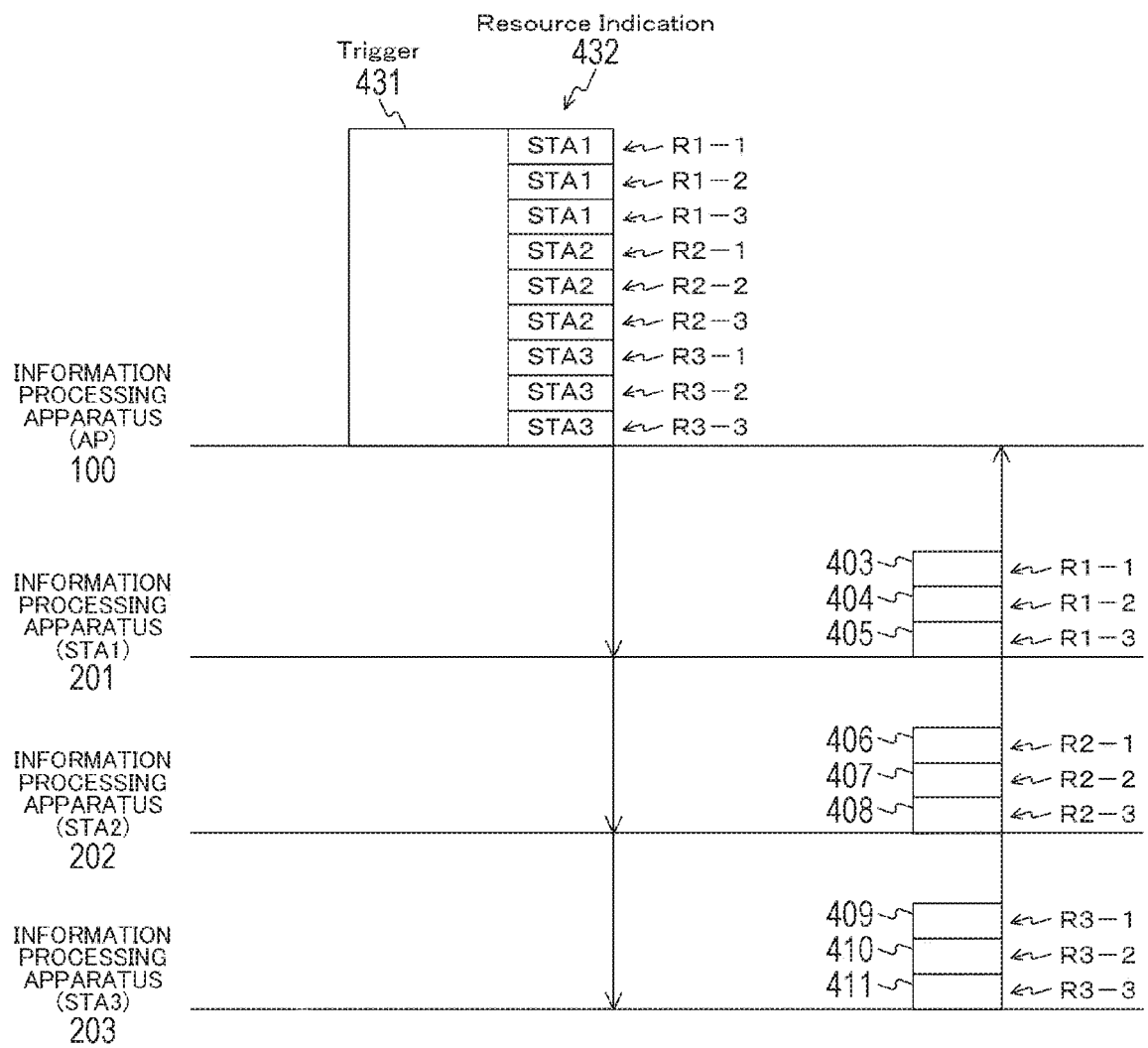
FIG. 7 is a sequence diagram illustrating an example of notification of MU resource bitmap assignments by the information processing apparatus (AP) 100 and information transmission by information processing apparatuses (STA1) 201 to (STA3) 203 according to the first embodiment of the present technology.

FIG. 7 illustrates another example in which the information processing apparatus (AP) 100 provides the channel resource assignment information (included in frames 432) coupled to a trigger frame 431.

Specifically, FIG. 7 illustrates an example in which the frame for providing the channel resource assignment information is multiplexed and transmitted. The channel resources for use in the multiplexing transmission are the same as the channel resources of which the information processing apparatuses (STAs) are notified.

For example, it is assumed that the information processing apparatus (STA1) 201 is notified that uplink multiplexing transmission is performed by using the channel resource R1-1. In this case, the information processing apparatus (AP) 100 transmits the frame 432 to the information processing apparatus (STA1) 201 by using the channel resource R1-1 to notify the information processing apparatus (STA1) 201 of the assignment of the channel resource R1-1.

For reference, FIG. 7 illustrates the channel resource assignment information (for example, destination and identification information of the channel resources) in the frames 432 in a simplified manner. FIG. 7 also illustrates the identification information R1-1 to R3-3 of the channel resources for use in the transmission, next to the rectangles indicating the frames. In this manner, referring to FIG. 7, only the information regarding the destination to which the information (the channel resource assignment information) is to be provided is stored in the frames 432.

For reference, the trigger frame 431 corresponds to the trigger frame 401 illustrated in FIG. 5. In the example illustrated in FIG. 7, however, a plurality of channel resources is used and the transmission time of the trigger frame 431 is shorter than that in the example illustrated in FIG. 5. The plurality of channel resources here includes frequency resources as sub channels for OFDMA and spatial resources for MIMO, and brings about shorter transmission time mainly due to improvement in the data rate by MIMO.

In addition, the trigger frame 431 can be transmitted by OFMDA or MIMO, and the frames 432 can be transmitted by OFMDA or MU-MIMO.

For reference, FIG. 7 illustrates an example in which a coupled frame of the frames 432 (including the channel resource assignment information) and the trigger frame 431 is transmitted. Alternatively, the channel resource assignment information may be included in part of the trigger frame 431.

Figure 8:
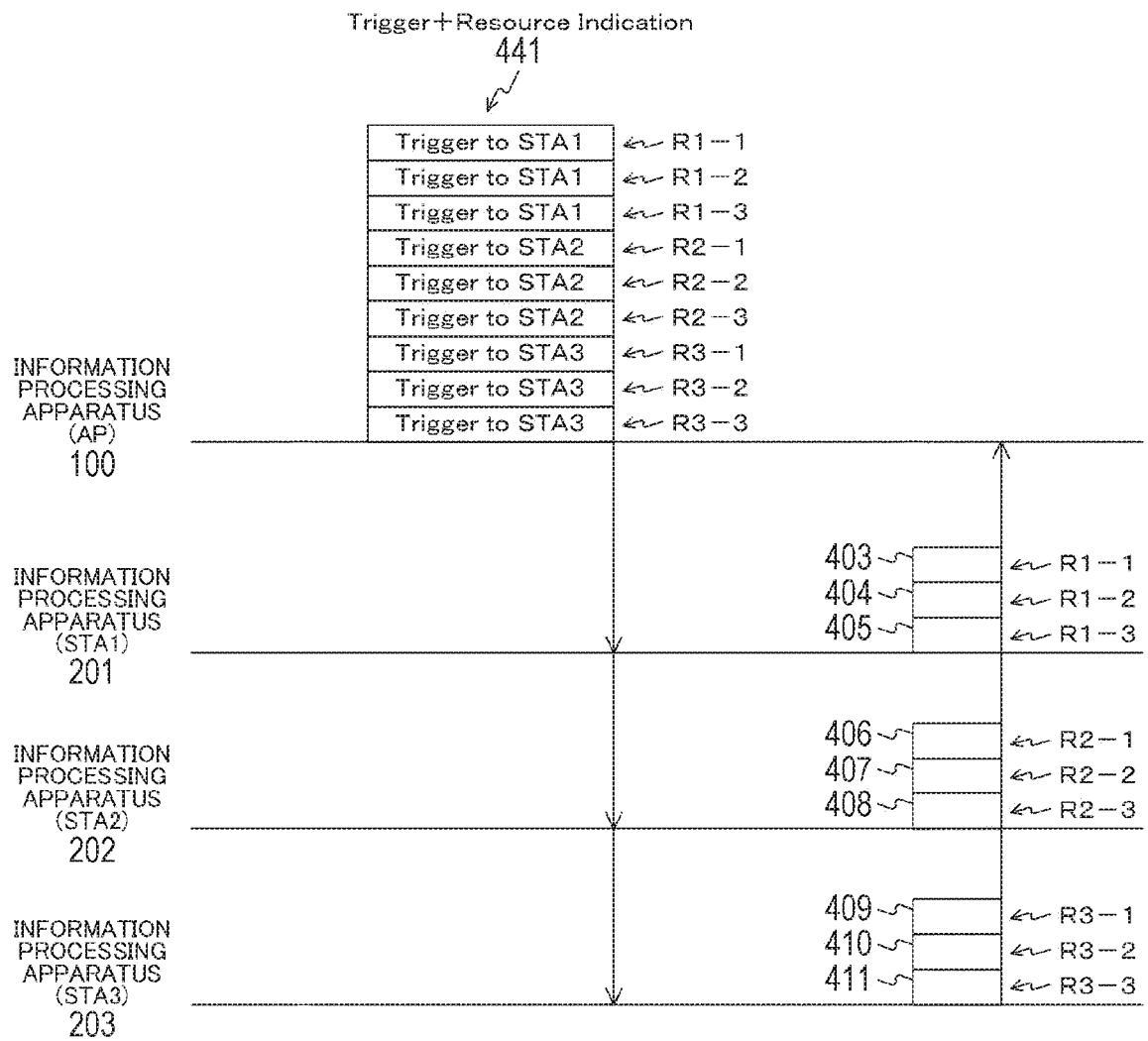
FIG. 8 is a sequence diagram illustrating an example of notification of MU resource bitmap assignments by the information processing apparatus (AP) 100 and information transmission by information processing apparatuses (STA1) 201 to (STA3) 203 according to the first embodiment of the present technology.

FIG. 8 illustrates an example in which the information processing apparatus (AP) 100 provides the channel resource assignment information by using only trigger frames 441.

Specifically, FIG. 8 illustrates an example in which the trigger frames 441 for providing the channel resource assignment information are multiplexed and transmitted. The channel resources for use in the multiplexing transmission are the same as the channel resources of which the information processing apparatuses (STAs) are notified.

For example, it is assumed that the information processing apparatus (STA1) 201 is notified that uplink multiplexing transmission is performed by using the channel resource R1-1. In this case, the information processing apparatus (AP) 100 transmits the trigger frame 441 by using the channel resource R1-1 to the information processing apparatus (STA1) 201 to notify the information processing apparatus (STA1) 201 of the assignment of the channel resource R1-1.

For reference, FIG. 8 illustrates the channel resource assignment information (for example, destination and identification information of the channel resources) in the trigger frames 441 in a simplified manner. FIG. 8 also illustrates the identification information R1-1 to R3-3 of the channel resources for use in the transmission, next to the rectangles indicating the trigger frames. In this manner, referring to FIG. 8, only the information regarding the destination to which the information (the channel resource assignment information) is to be provided is stored in the trigger frames 441.

In addition, the trigger frames 441 can be transmitted by OFMDA or MU-MIMO.

[Examples of Assignments of Channel Resources and Transmission of Information Using the Assigned Channel Resources]

In the first embodiment of the present technology, to provide at least one piece of information by the information processing apparatuses (STAs) to the information processing apparatus (AP) 100, the information processing apparatus (AP) 100 assigns two or more channel resources to one information processing apparatus (STA). In addition, specific assignment methods will be described with reference to FIGS. 9*a*, 9*b*, 10*a*, 10*b*, 11*a*, 11 *b*, 12*a*, and 12*b*.

[Example in which Three Channel Resources are Assigned to One Information Processing Apparatus (STA) and the Information Processing Apparatus (STA) Provides One Piece of Information to the Information Processing Apparatus (AP)]

FIGS. 9*a* and 9*b* are diagrams illustrating an example of channel resources assigned to the information processing apparatuses (STAs) and information provided by the information processing apparatuses (STAs) to the information processing apparatus (AP) 100 according to the first embodiment of the present technology.

Specifically, FIGS. 9*a* and 9*b* illustrate an example of a case where two or more channel resources are assigned to one information processing apparatus (STA) to provide one piece of information. In this case, one-bit amount of information can be provided in one channel resource. For example, in a case where three channel resources are assigned to one information processing apparatus (STA), the information processing apparatus (STA) can provide three-bit information to the information processing apparatus (AP).

An example of channel resource assignments is illustrated in FIG. 9*a*. In the example illustrated in FIG. 9*a*, three channel resources are assigned to one information processing apparatus (STA). For example, the channel resources R1-1 to R1-3 can be assigned to the information processing apparatus (STA1) 201. Similarly, the channel resources R2-1 to R2-3 can be assigned to the information processing apparatus (STA2) 202, and the channel resources R3-1 to R3-3 can be assigned to the information processing apparatus (STA3) 203. For reference, in the example of FIGS. 9a and 9b, the channel resources R1-4, R2-4, and R3-4 are not assigned.

An example of relationship between the assigned channel resources and the information provided to the information processing apparatus (AP) 100 is illustrated in FIG. 9b. In the example illustrated in FIG. 9b, the information processing apparatuses (STAs) notify the information processing apparatus (AP) of packet error rate (PER).

As illustrated in FIG. 9b, each of the information processing apparatuses (STAs) can transmit 3-bit information by using the three channel resources assigned thereto. In this case, each of the information processing apparatuses (STAs) specifies one of eight ranges corresponding to the value of PER measured therein, and transmits the information within the range.

For example, in a case where the value of PER measured in the information processing apparatus (STA1) 201 is 0.01 to 0.02, the information processing apparatus (STA1) 201 transmits the information corresponding to the PER range "0.01 to 0.02" (R1-1 "0", R1-2 "0", and R1-3 "1").

For reference, the instruction for transmission of the PER by three-bit information can be provided on the basis of some information. For example, the instruction may be included in a beacon to be exchanged or may be provided in preliminary exchange of other information. In addition, the information (for example, the table illustrated in FIG. 9b for generating the transmission information (three-bit information) may be included and provided in a beacon or may be provided in preliminary exchange of other information. In addition, as the information for generating the transmission information, notification of a threshold (for example, a threshold of PER or RSSI) may be provided such that the information processing apparatuses (STAs) provide the information only in a case where the threshold is exceeded. In this manner, the information processing apparatus (AP) 100 can provide the information regarding a transmission condition (for example, the threshold of PER) to the information processing apparatuses (STAs). In this case, the information processing apparatuses (STAs) can determine whether to transmit information (for example, the value of PER) to the information processing apparatus (AP) 100, on the basis of the information regarding the transmission condition (for example, the threshold of PER). That is, the control unit 150 of the information processing apparatus (AP) 100 can provide the information regarding the transmission condition to the information processing apparatuses (STAs) and perform a control to cause the information processing apparatuses (STAs) to transmit signals on the basis of the provided information.

[Example in which Three Channel Resources are Assigned to One Information Processing Apparatus (STA) and the Information Processing Apparatus (STA) Provides Two Pieces of Information to the Information Processing Apparatus (AP)]

FIGS. 10a and 10b are diagrams illustrating an example of channel resources assigned to the information processing apparatuses (STAs) and information provided by the information processing apparatuses (STAs) to the information processing apparatus (AP) 100 according to the first embodiment of the present technology.

Specifically, FIGS. 10a and 10b illustrate an example of a case where two or more channel resources are assigned to one information processing apparatus (STA) to provide two pieces of information. For example, in a case where three channel resources are assigned to one information processing apparatus (STA), the information processing apparatus can provide three-bit information. Accordingly, in the example of FIGS. 10a and 10b, two bits are used to provide one piece of information and one bit is used to provide the other piece of information.

An example of channel resource assignments is illustrated in FIG. 10a. In the example illustrated in FIG. 10a, three channel resources are assigned to one information processing apparatus (STA).

An example of relationship between the assigned channel resources and the information provided to the information processing apparatus (AP) 100 is illustrated in FIG. 10b. In the example illustrated in FIG. 10b, the information processing apparatuses (STAs) notify the information processing apparatus (AP) 100 of PER and received signal strength indicator (RSSI).

As illustrated in FIG. 10b, each of the information processing apparatuses (STAs) can transmit 3-bit information by using the three channel resources assigned thereto. In this case, each of the information processing apparatuses (STAs) specifies one of two ranges corresponding to the value of PER measured therein, and transmits the information within the range. In addition, each of the information processing apparatuses (STAs) specifies one of four ranges corresponding to the value of RSSI measured therein, and transmits the information within the range.

For example, in a case where the value of PER measured in the information processing apparatus (STA1) 201 is 0.10 to 1.00, the information processing apparatus (STA1) 201 transmits the information corresponding to the PER range "0.10 to 1.00" (R1-1 "1"). In addition, for example, in a case where the value of RSSI measured in the information processing apparatus (STA1) 201 is −40 to 0 dBm, the information processing apparatus (STA1) 201 transmits the information corresponding to the RSSI range "−40 to 0 dBm" (R1-2 "1" and R1-3 "0").

In this manner, the control unit 150 of the information processing apparatus (AP) 100 performs a control to assign a plurality of channel resources to a plurality of information processing apparatuses (STAs) and notify the plurality of information processing apparatuses (STAs) of the assignments. In this case, the control unit 150 of the information processing apparatus (AP) 100 can assign two or more channel resources to each of the information processing apparatuses (STAB). For reference, the plurality of channel resources includes combinations of frequency channel resources and spatial channel resource as illustrated in FIG. 3, for example.

In addition, the control unit 150 of the information processing apparatus (AP) 100 performs a control to notify that signals in a simplified frame format are transmitted by using the assigned channel resources. In addition, the control unit 150 of the information processing apparatus (AP) 100 performs a control to provide information necessary for the information processing apparatuses (STAs) to transmit the signals by using the plurality of assigned channel resources. The necessary information may include modulation encoding scheme, transmission power, time (transmission timing), and information to be transmitted, for example. The necessary information can be provided in a trigger frame (for example, the trigger frame 401 illustrated in FIG. 5), a beacon, or the like, for example.

In addition, the control unit 150 of the information processing apparatus (AP) 100 performs a control to notify the information processing apparatuses (STAs) that signals for providing one or more pieces of information to the information processing apparatus (AP) 100 are transmitted by using two or more channel resources. In this case, the control unit 150 of the information processing apparatus (AP) 100 can perform a control to cause the information processing apparatuses (STAs) to transmit information regarding the reception status as the one or more pieces of information (for example, PER and RSSI). The information can be provided in a trigger frame (for example, the trigger frame 401 illustrated in FIG. 5), a beacon, or the like, for example.

In addition, the communication unit 120 of the information processing apparatus (AP) 100 receives the signals transmitted by the information processing apparatuses (STAs) using the plurality of assigned channel resources, in each of the plurality of channel resources. In this case, the control unit 150 of the information processing apparatus (AP) 100 can acquire one or more pieces of information (for example, PER and RSSI) including the plurality of signals received in each of the plurality of channel resources.

In addition, the control units (equivalent to the control unit 150 illustrated in FIG. 2) of the information processing apparatuses (STAs) can provide one or more pieces of information by transmitting a plurality of specified signals (for example, three bits) within the ranges of the channel resources notification of which is provided by the information processing apparatus (AP) 100.

[Example in which the Information Processing Apparatuses (STAs) Provide Redundant Information to the Information Processing Apparatus (AP)]

FIGS. 11a and 11b are diagrams illustrating an example of channel resources assigned to the information processing apparatuses (STAs) and information provided by the information processing apparatuses (STAs) to the information processing apparatus (AP) 100 according to the first embodiment of the present technology.

Specifically, FIGS. 11a and 11b illustrate an example of a case where two or more channel resources are assigned to one information processing apparatus (STA) to provide two pieces of information. In addition, in the example of FIGS. 11a and 11b, the same information is provided in two or more channel resources for redundancy of the information.

For example, in a case where three channel resources are assigned to one information processing apparatus (STA), one each bit is used for two pieces of information. In this case, the remaining one bit can be used for duplicate delivery of the relatively important information. With this arrangement, it is possible to increase the redundancy of the relatively important information, thereby achieving improvement in the quality of communications.

In addition, the important information may not be any one of the plurality of pieces of information but may be an important bit of single piece of information (for example, the most significant bit), for example.

An example of channel resource assignments is illustrated in FIG. 11a. In the example illustrated in FIG. 11a, three channel resources are assigned to one information processing apparatus (STA).

An example of relationship between the assigned channel resources and the information provided to the information processing apparatus (AP) 100 is illustrated in FIG. 11b. In the example illustrated in FIG. 11b, the information processing apparatuses (STAs) notify the information processing apparatus (AP) 100 of PER and RSSI. However, in the example illustrated in FIG. 11b, PER is set as relatively important information and is redundantly provided using one bit.

As illustrated in FIG. 11b, each of the information processing apparatuses (STAs) can transmit three-bit information by using the three channel resources assigned thereto. In this case, each of the information processing apparatuses (STAs) specifies one of two ranges corresponding to the value of PER measured therein, and transmits the information within the range by using one bit. Here, as described above, each of the information processing apparatuses (STAs) transmits the same information by using another bit.

In addition, each of the information processing apparatuses (STAs) specifies one of two ranges corresponding to the value of RSSI measured therein, and transmits the information within the range.

For example, in a case where the value of PER measured therein is 0.10 to 1.00, the information processing apparatus (STA1) 201 transmits the information corresponding to the PER range "0.10 to 1.00" (R1-1 "1"). In this case, the information processing apparatus (STA1) 201 transmits the same information "1" by using another channel resource R1-3.

In addition, for example, in a case where the value of RSSI measured therein is −40 dBm or more, the information processing apparatus (STA1) 201 transmits the information corresponding to the RSSI range "−40 dBm or more" (R1-2 "1").

In this manner, the control unit 150 of the information processing apparatus (AP) 100 can perform a control to notify a plurality of information processing apparatuses (STAs) that signals for providing the same information to the information processing apparatus (AP) 100 are transmitted by using different channel resources. In this case, the information processing apparatuses (STAs) transmit the signals for providing the same information (for example, PER) to the information processing apparatus (AP) 100 by using different channel resources.

[Another Example of Channel Resource Assignments]

FIGS. 12a, 12b, and 12c are diagrams illustrating another example of channel resources assigned to the information processing apparatuses (STAs) according to the first embodiment of the present technology.

An example in which the same frequency channel resources are assigned to the same information processing apparatuses (STAs) is illustrated in FIG. 12a. An example in which the same spatial channel resources are assigned to the same information processing apparatuses (STAs) is illustrated in FIG. 12b. An example in which different frequency or spatial channel resources with redundant bits are assigned to the information processing apparatuses (STAs) is illustrated in FIG. 12c.

As illustrated in FIG. 12a, in a case where two or more channel resources are assigned to one information processing apparatus (STA), the channel resources can be assigned to the same frequency channel. For example, the channel resources R1-1 to R1-3 can be assigned to the information processing apparatus (STA1) 201. With such assignments, even if there occurs a deterioration in the communication environment of one frequency channel, it is possible to receive the information from one information processing apparatus (STA) under no influence of the deterioration.

In addition, as illustrated in FIG. 12b, in a case where two or more channel resources are assigned to one information processing apparatus (STA), the channel resources can be assigned to the same spatial channel. For example, the channel resources R1-1, R2-1, and R3-1 can be assigned to the information processing apparatus (STA1) 201. With such assignments, even if there occurs a deterioration in the communication environment of one spatial channel, it is possible to receive the information from one information processing apparatus (STA) under no influence of the deterioration.

In this manner, in a case where two or more channel resources are assigned to the information processing apparatuses (STAs), the control unit 150 of the information processing apparatus (AP) 100 can assign the same frequency channel resources or the same spatial channel resources to the information processing apparatuses (STAB).

In addition, as illustrated in FIG. 12c, in a case where two or more channel resources are assigned to one information processing apparatus (STA), different frequency or spatial channel resources can be assigned to the information processing apparatus (STA). For example, the channel resources R1-1 to R1-3, and R2-4 can be assigned to the information processing apparatus (STA1) 201. In this case, a redundant bit can be assigned to the channel resource R2-4. With such assignments, even if there occurs a deterioration in the communication environment of one frequency channel, it is possible to receive the redundant bit of information under no influence of the deterioration.

These assignment methods may be changed as appropriate depending on the communication environment. For example, in a case of detecting that the requested information is not transmitted by one information processing apparatus (STA), the information processing apparatus (AP) 100 can change the channel resource assignment to the information processing apparatus (STA). Alternatively, for example, the information processing apparatus (AP) 100 may change the assignment method to change the channel resource assignment to the information processing apparatus (STA).

For reference, the information provided in the channel resources assigned to each of the information processing apparatuses (STAs) is not limited to the foregoing one. For example, other information may be provided in the channel resources assigned to each of the information processing apparatuses (STAs). For example, as the other information, the information regarding the reception status in the information processing apparatuses (STAs) may be provided. Here, the reception status refers to the information regarding, for example, packet error rate, throughput, signal noise ratio (SNR), received packet count, received signal strength indicator (RSSI), or block ack bitmap. Alternatively, some combination of these items may be transmitted in a specific pattern.

[Operation Example of the Information Processing Apparatus (AP)]

Figure 13:
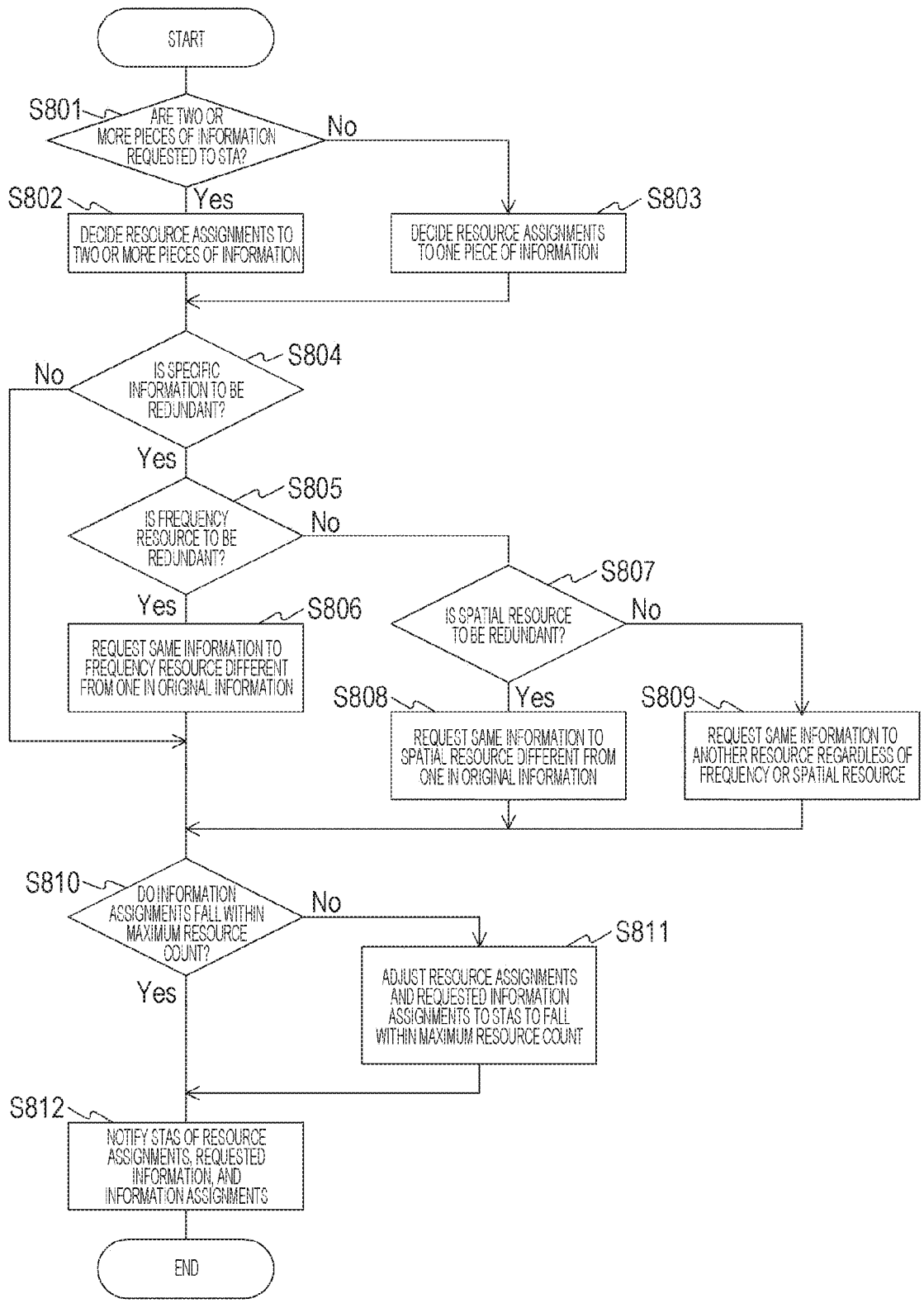
FIG. 13 is a flowchart of an example of a procedure for data transmission processing by the information processing apparatus (AP) 100 according to the first embodiment of the present technology.

FIG. 13 is a flowchart of an example of a procedure for data transmission processing by the information processing apparatus (AP) 100 according to the first embodiment of the present technology.

The control unit 150 of the information processing apparatus (AP) 100 determines whether to request two or more pieces of information from each of the information processing apparatuses (STAs) connected thereto (step S801). In a case of requesting two or more pieces of information from each of the information processing apparatuses (STAs) (step S801), the control unit 150 of the information processing apparatus (AP) 100 decides channel resource assignments for transmitting the two or more pieces of information requested (step S802). For example, the assignments can be decided by the assignment method illustrated in FIGS. 10a and 10b or FIGS. 11a and 11b.

In a case of requesting one piece of information from each of the information processing apparatuses (STAs) (step S801), the control unit 150 of the information processing apparatus (AP) 100 decides channel resource assignments for transmitting the one piece of information requested (step S803). For example, the assignments can be decided by the assignment method illustrated in FIGS. 9a and 9b.

Subsequently, the control unit 150 of the information processing apparatus (AP) 100 determines whether to provide redundancy to certain information (step S804). In a case of providing no redundancy to any information (step S804), the control unit 150 moves to step S810.

In a case of providing redundancy to certain information (step S804), the control unit 150 of the information processing apparatus (AP) 100 determines whether to provide redundancy to the frequency channel resources (step S805).

In a case of providing redundancy to the frequency channel resources (step S805), the control unit 150 of the information processing apparatus (AP) 100 assigns the same information as information to be redundant (original information) to a frequency channel resource different from the channel resource for transmitting the information to be redundant (step S806).

In a case of providing no redundancy to the frequency channel resources (step S805), the control unit 150 of the information processing apparatus (AP) 100 determines whether to provide redundancy to the spatial channel resources (step S807).

In a case of providing redundancy to the spatial channel resources (step S807), the control unit 150 of the information processing apparatus (AP) 100 assigns the same information as information to be redundant (original information) to a spatial channel resource different from the channel resource for transmitting the information to be redundant (step S808).

In a case of providing no redundancy to the spatial channel resources (step S807), the control unit 150 of the information processing apparatus (AP) 100 assigns the same information as information to be redundant (original information) to a channel resource different from the channel resource for transmitting the information to be redundant, regardless of the frequency channel resource or the spatial channel resource (step S809).

Subsequently, the control unit 150 of the information processing apparatus (AP) 100 determines whether the assignments of requested information to the information processing apparatuses (STAs) fall within the maximum number of channel resources (step S810). In a case where the assignments of requested information to the information processing apparatuses (STAs) exceed the maximum number of channel resources (step S810), the control unit 150 of the information processing apparatus (AP) 100 adjusts the assignments of requested information to the information processing apparatuses (STAs) (step S811). Then, the control unit 150 moves to step S812. For example, the control unit 150 of the information processing apparatus (AP) 100 adjusts the assignments of channel resource and the assignments of requested information to the information processing apparatuses (STAs) to fall within the maximum number of channel resources (step S811).

In a case where the assignments of requested information to the information processing apparatuses (STAs) fall within the maximum number of channel resources (step S810), the control unit 150 of the information processing apparatus (AP) 100 provides predetermined information to each of the information processing apparatuses (STAs) (step S812). The predetermined information includes, for example, the channel resource assignments, the requested information, and the information assignments. In addition, for example, the predetermined information is provided by a method by which the plurality of information processing apparatuses can receive (for example, OFDMA, MU-MIMO, multicast, and broadcast).

[Operation Example of the Information Processing Apparatus (STA)]

Figure 14:
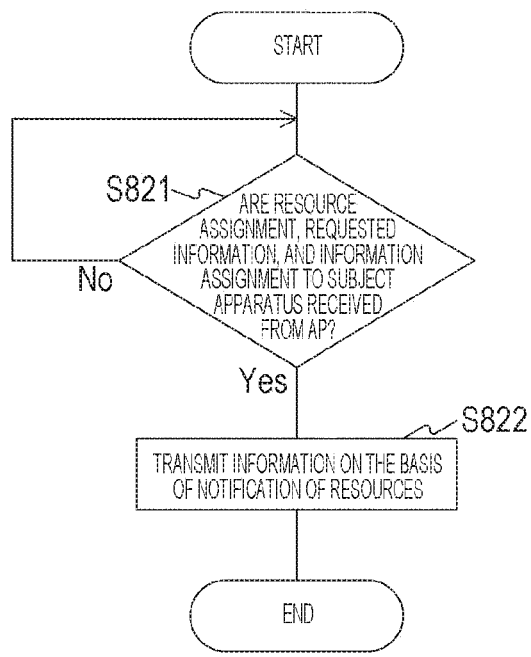
FIG. 14 is a flowchart of an example of a procedure for data reception processing by the information processing apparatus (STA1) 201 according to the first embodiment of the present technology.

FIG. 14 is a flowchart of an example of a procedure for data reception processing by the information processing apparatus (STA1) 201 according to the first embodiment of the present technology. For reference, the procedure is similarly applicable to operations of the other information processing apparatuses (STAs).

The control unit (equivalent to the control unit 150 illustrated in FIG. 2) of the information processing apparatus (STA1) 201 determines whether the channel resource assignment, the requested information, and the information assignment have been received from the information processing apparatus (AP) 100 (step S821). In a case where the foregoing information has not been received, the control unit continues monitoring.

In a case where the foregoing information has been received from the information processing apparatus (AP) 100 (step S821), the control unit of the information processing apparatus (STA1) 201 transmits the requested information on the basis of the received information (step S822). That is, the control unit of the information processing apparatus (STA1) 201 uses the channel resources assigned thereto by the information processing apparatus (AP) 100 to transmit the requested information according to the information assignment (step S822).

In this manner, the information processing apparatus (STA1) 201 receives a notification that the plurality of channel resources is assigned to the information processing apparatus (STA1) 201. Then, upon receipt of the notification, the control unit of the information processing apparatus (STA1) 201 performs a control to transmit to the information processing apparatus (AP) 100 a plurality of signals for providing predetermined information to the information processing apparatus (AP) 100 by using the plurality of assigned channel resources. In this case, the control unit of the information processing apparatus (STA1) 201 performs a control to transmit the signals in a simplified frame format (for example, as illustrated in FIG. 4b) by using the plurality of assigned channel resources. In addition, for example, the predetermined information is information requested by the information processing apparatus (AP) 100 (for example, PER and RSSI).

In this manner, the information processing apparatus (AP) 100 assigns a plurality of channel resources to a plurality of information processing apparatuses (STAs), and notifies the plurality of information processing apparatuses (STAs) of the assignments. In addition, upon receipt of the notification, the information processing apparatuses (STAs) transmit to the information processing apparatus (AP) 100 a plurality of signals for providing the predetermined information (for example, PER and RSSI) to the information processing apparatus (AP) 100 by using the plurality of assigned channel resources.

2. Second Embodiment

In a second embodiment of the present technology, the same channel resource is assigned to two or more information processing apparatuses (STAs) and notification of the assignment is provided thereto as an example.

For reference, the configurations of apparatuses in the second embodiment of the present technology are almost identical to those of the information processing apparatus (AP) 100 and the information processing apparatuses (STA1) 201 to (STA3) 203 illustrated in FIGS. 1, 2, and others. Accordingly, the components in common with the first embodiment of the present technology will be given the same reference signs as those in the first embodiment of the present technology, and descriptions thereof will be partially omitted.

In addition, similarly to the first embodiment of the present technology, the MU resource bitmap includes total M×N channel resources R1-1 to RM-N at a maximum. In the example described below, however, there exist total 36 channel resources with M=9 and N=4, for the ease of explanation.

In addition, in the second embodiment of the present technology, the 36 channel resources are assigned to a single information processing apparatus (STA) and are similarly assigned to the other information processing apparatuses (STAB).

[Example in which the Same 36 Channel Resources are Assigned to Each of the Information Processing Apparatuses (STAs) and Notification of the Assignments is Provided Thereto]

Figure 15:
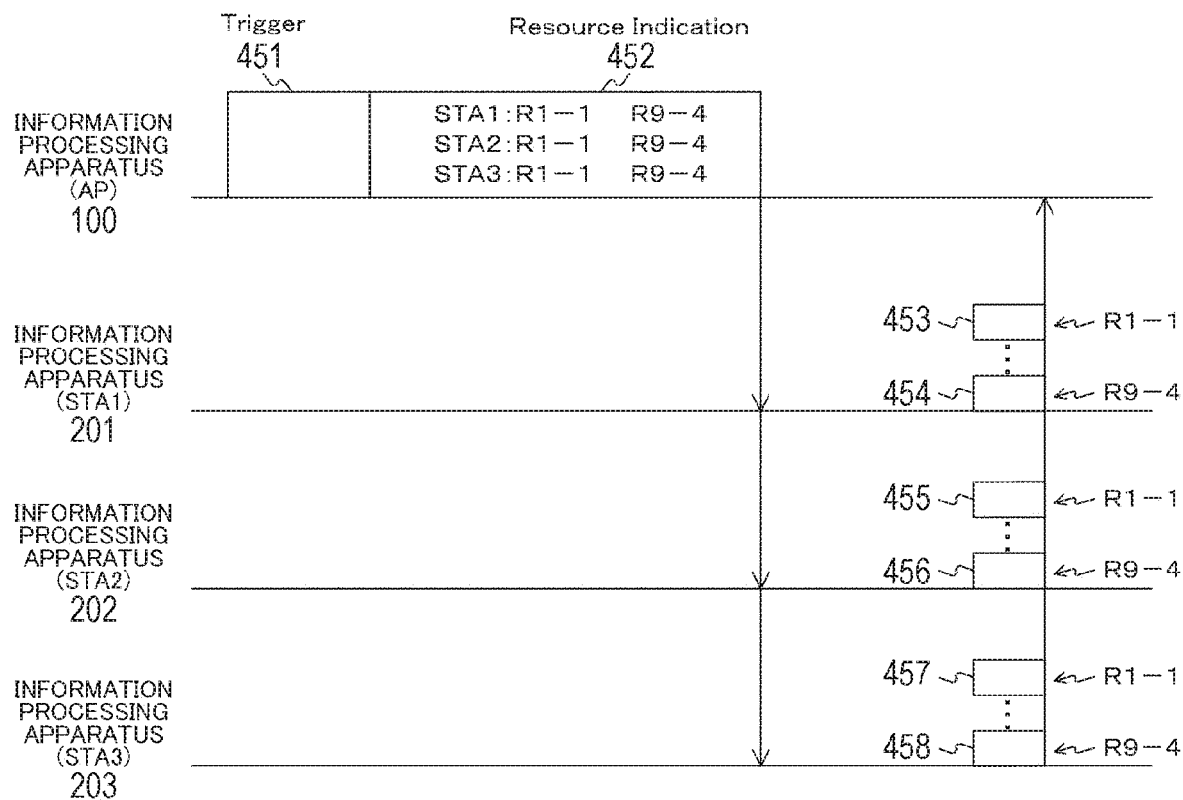
FIG. 15 is a sequence diagram illustrating an example of notification of MU resource bitmap assignments by the information processing apparatus (AP) 100 and information transmission by the information processing apparatuses (STA1) 201 to (STA3) 203 according to a second embodiment of the present technology.

FIG. 15 is a sequence diagram illustrating an example of notification of MU resource bitmap assignments by the information processing apparatus (AP) 100 and information transmission by the information processing apparatuses (STA1) 201 to (STA3) 203 according to the second embodiment of the present technology.

FIG. 15 illustrates an example in which the information processing apparatus (AP) 100 assigns the MU resource bitmap to the information processing apparatuses (STA1) 201 to (STA3) 203. In addition, in the example illustrated in FIG. 15, the information processing apparatuses (STA1) 201 to (STA3) 203 transmit information according to the assignments. Furthermore, in the example illustrated in FIG. 15, the 36 channel resources are assigned to the three information processing apparatuses (STA1) 201 to (STA3) 203. Moreover, the channel resources may be assigned to a group including the three information processing apparatuses (STA1) 201 to (STA3) 203.

Note that a trigger frame 451, a frame 452, and information 453 to 458 correspond to the trigger frame 401, the frame 402, and the information 403 to 411 illustrated in FIG. 5, and descriptions thereof will be omitted here.

[Example of Relationship Among STA Transmitted Contents, AP Received Contents, and the Number of NACK Transmissions]

FIG. 16 is a diagram illustrating an example of relationships among contents transmitted by the information processing apparatuses (STAs), contents received by the information processing apparatus (AP) 100, and the number of NACK transmissions by the information processing apparatuses (STAs) according to the second embodiment of the present technology. That is, FIG. 16 illustrates an example of results of operations in a Negative ACKnowledgement (NACK)-based system using the MU resource bitmap.

Here, it is assumed that the information processing apparatus (AP) 100 receives information (signals) transmitted by the information processing apparatuses (STAs) on the basis of the channel resource assignments. For example, assuming that one channel resource stores one-bit information, when at least one of the three information processing apparatuses (STA1) 201 to (STA3) 203 transmits 1, the information processing apparatus (AP) 100 observes 1. That is, the result of reception takes logical sum.

Using this operation makes it possible to store a Block Ack bitmap formed by NACK to multicast in the MU resource bitmap and transmit the same in an NACK-based system, for example. With this arrangement, the information processing apparatus (AP) 100 can determine a data frame that has not been received by at least one information processing apparatus (STA) and is to be retransmitted.

For example, it is assumed that multicast packets (sequence numbers: 0 to 35) are transmitted by the information processing apparatus (AP) 100 to each of the information processing apparatuses (STAs). In this case, each of the information processing apparatuses (STAs) can store the reception result in the MU resource bit map and transmit the same. For example, the channel resource R1-1 is associated with the sequence number 0, and the channel resource R1-2 is associated with the sequence number 2. Similarly, the other channel resources are sequentially associated with the sequence numbers.

Here, the sequence number associated with the channel resource R1-1 (starting sequence number) can be transmitted in advance by the information processing apparatus (AP) 100 to each of the information processing apparatuses (STAs) through information exchange.

FIG. 16 illustrates an example of results of transmission by the information processing apparatus (STA1) 201 to the information processing apparatus (STA3) 203 and results of reception by the information processing apparatus (AP) 100.

Here, in the NACK-based system, it can be determined that the packet with the sequence number associated with the channel resource that takes 1 as result of reception by the information processing apparatus (AP) 100 has not been received by at least one information processing apparatus (STA). Accordingly, it can be determined that the packet with the sequence number associated with the channel resource that takes 1 in the reception result is to be re-transmitted. However, the reception result is a logical sum, and it is not possible to comprehend how many information processing apparatuses (STAs) have actually received the packet.

For example, FIG. 16 illustrates a case based on the assumption that, out of the three information processing apparatuses (STA1) 201 to (STA3) 203, the information processing apparatus (STA3) 203 is inferior in reception characteristic to the other information processing apparatuses (STA1) 201 and (STA2) 202. In this case, many of the results of reception by the information processing apparatus (AP) 100 take 1. In particular, as illustrated in FIG. 16, many of the information processing apparatuses (STAs) have transmitted NACK on the channel resources R1-4 and R9-3, and it can be considered that the packets corresponding to these channel resources are to be re-transmitted with higher priority than the packets corresponding to the other channel resources.

Accordingly, an example in which the information processing apparatus (AP) 100 checks the reception power of NACK will be described below.

For example, in a case where the information processing apparatus (AP) 100 receives the signals from the information processing apparatuses (STAs) with identical reception power, the reception power is proportional to the number of information processing apparatuses (STAs). Accordingly, in a case where the information processing apparatus (AP) 100 receives the signals from the information processing apparatuses (STAs) with identical reception power, the information processing apparatus (AP) 100 can check the reception power to predict the number of information processing apparatuses (STAs) having transmitted NACK. With this arrangement, the information processing apparatus (AP) 100 can determine the priority of re-transmission.

Here, when only one information processing apparatus (STA) in proximity to the information processing apparatus (AP) 100 transmits NACK, for example, it is presumed that the absolute value of the reception power will be greater than those of the other information processing apparatuses. In general, it is presumed that a failure of an information processing apparatus (STA) in proximity to the information processing apparatus (AP) 100 to receive a packet is caused by an accidental packet collision. In this case, it is highly expected that the re-transmission to the information processing apparatus (STA) in proximity to the information processing apparatus (AP) 100 will recover from the failure, and it can be determined that the packet is to be re-transmitted with a higher priority.

Meanwhile, it is presumed that a failure of reception by an information processing apparatus (STA) distant from the information processing apparatus (AP) 100 is caused by SNR deterioration due to lack of signal power. Accordingly, it is assumed that the re-transmission to the information processing apparatus (STA) distant from the information processing apparatus (AP) 100 will be unlikely to bring about recovery from the failure, and it can be determined that the packet is to be re-transmitted with a lower priority. The information processing apparatus (AP) 100 can control re-transmission on the basis of the thus determined priorities.

In addition, it is assumed that the reception power of the information processing apparatus (AP) 100 varies among the information processing apparatuses (STAs) depending on the proximities of the information processing apparatuses (STAs). In this case, after calibration by preliminary training, the magnitude of the reception power of the information processing apparatus (AP) 100 may be determined.

In addition, the information processing apparatus (AP) 100 may provide notification of a threshold of NACK (for example, the number of NACK transmissions) to prevent an information processing apparatus (STA) inferior in characteristic from transmitting NACK a greater number of times than the threshold notification of which is provided. With this arrangement, it is possible to avoid a situation in which it is difficult to determine the packet to be re-transmitted with a higher priority due to a large number of NACK transmissions by the information processing apparatus (STA) inferior in characteristic. In this manner, the information processing apparatus (AP) 100 can provide the information regarding the transmission condition (for example, the threshold of NACK) to each of the information processing apparatuses (STAs). In this case, each of the information processing apparatuses (STAs) can determine whether to transmit the information (for example, NACK) to the information processing apparatus (AP) 100 on the basis of the information regarding the transmission condition (for example, the threshold of NACK). That is, the control unit 150 of the information processing apparatus (AP) 100 can perform a control to provide the information regarding the transmission condition to each of the information processing apparatuses (STAs) and cause each of the information processing apparatuses (STAs) to transmit signals on the basis of the provided information.

In this manner, the control unit 150 of the information processing apparatus (AP) 100 can perform a control to assign two or more identical ones of the plurality of channel resources to each of the plurality of information processing apparatuses (STAs). In addition, the control unit 150 of the information processing apparatus (AP) 100 can perform a control to cause the plurality of information processing apparatuses (STAs) to transmit the signals for providing notification of the results of reception of multicast to the plurality of information processing apparatuses (STAs), by using the identical channel resources. In this case, the control unit 150 of the information processing apparatus (AP) 100 can determine the number of information processing apparatuses (STAs) having transmitted the signals, on the basis of the reception power of the signals transmitted by using the identical channel resources. In addition, the control unit 150 of the information processing apparatus (AP) 100 can determine the priorities of re-transmission in response to the multicast transmission, on the basis of the reception power of the signals transmitted by using the identical channel resources.

[Operation Example of the Information Processing Apparatus (AP)]

Figure 17:
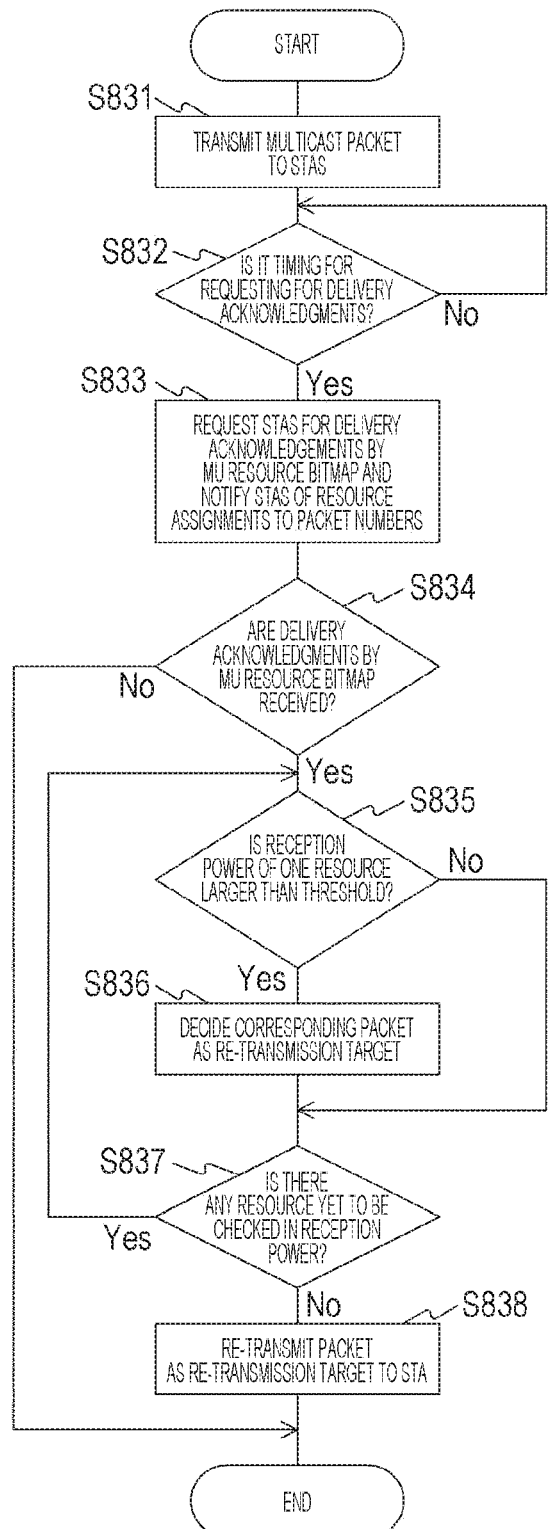
FIG. 17 is a flowchart of an example of a procedure for data transmission processing by the information processing apparatus (AP) 100 according to the second embodiment of the present technology.

FIG. 17 is a flowchart of an example of a procedure for data transmission processing by the information processing apparatus (AP) 100 according to the second embodiment of the present technology.

The control unit 150 of the information processing apparatus (AP) 100 transmits multicast packets to each of the information processing apparatuses (STAs) connected thereto (step S831). Subsequently, the control unit 150 of the information processing apparatus (AP) 100 determines whether it is the timing for requesting for the delivery acknowledgement of the multicast packets (step S832). In a case where it is not the timing for requesting for the delivery acknowledgement, the control unit 150 continues monitoring.

In a case where it is the timing for requesting for the delivery acknowledgement (step S832), the control unit 150 of the information processing apparatus (AP) 100 transmits a request for the delivery acknowledgement in the MU resource bitmap and provides notification of the channel resource assignments to the packet numbers to each of the information processing apparatuses (STAs) (step S833).

Subsequently, the control unit 150 of the information processing apparatus (AP) 100 determines whether the delivery acknowledgement in the MU resource bitmap has been received (step S834). In a case where no delivery acknowledgement in the MU resource bitmap has been received (step S834), the control unit 150 terminates the data transmission process.

In a case where the delivery acknowledgement in the MU resource bitmap has been received (step S834), the control unit 150 of the information processing apparatus (AP) 100 determines whether the reception power of one of the plurality of channel resources is greater than the threshold (step S835). In a case where the reception power of the channel resource is equal to or less than the threshold (step S835), the control unit 150 moves to step S837.

In a case where the reception power of the channel resource is greater than the threshold (step S835), the control unit 150 of the information processing apparatus (AP) 100 decides the packet associated with the channel resource as a re-transmission target (step S836).

Subsequently, the control unit 150 of the information processing apparatus (AP) 100 determines whether there exists any of the plurality of channel resources that has not yet been compared to the threshold (step S837). In a case where there exists any channel resource that has not yet been compared to the threshold (step S837), the control unit 150 of the information processing apparatus (AP) 100 selects the channel resource that has not yet been compared to the threshold, from among the plurality of channel resources, as a comparison target. Then, the control unit 150 of the information processing apparatus (AP) 100 determines whether the reception power of the channel resource is larger than the threshold (step 835).

In a case where there exists no channel resource that has not yet been compared to the threshold (step S837), the control unit 150 of the information processing apparatus (AP) 100 transmits the packet decided as re-transmission target to each of the information processing apparatuses (STAs) (step S838). That is, the control unit 150 of the information processing apparatus (AP) 100 re-transmits the packet decided as re-transmission target (step S838).

[Operation Example of the Information Processing Apparatus (STA)]

Figure 18:
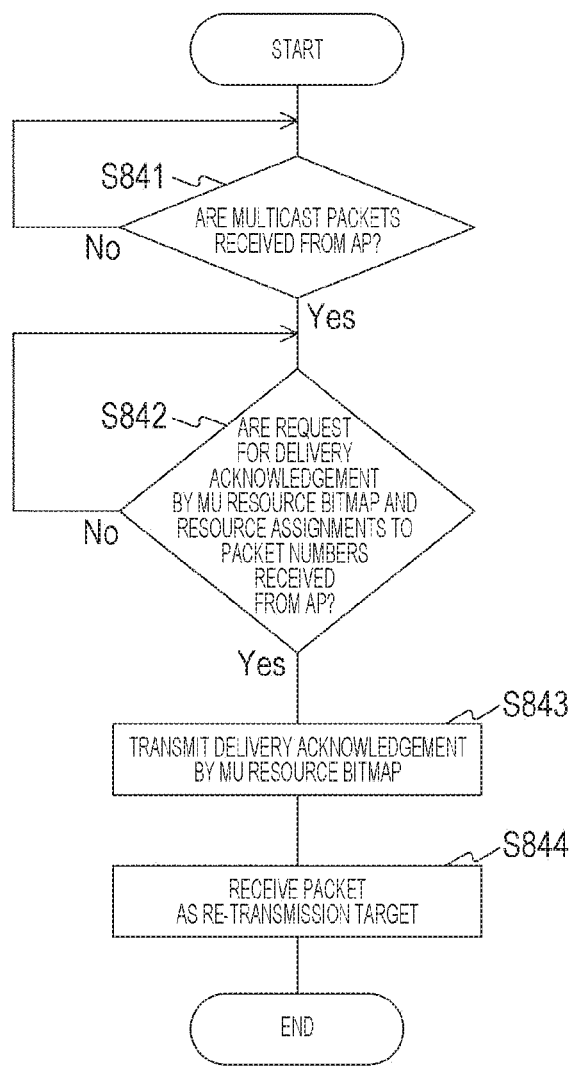
FIG. 18 is a flowchart of an example of a procedure for data reception processing by the information processing apparatus (STA1) 201 according to the second embodiment of the present technology.

FIG. 18 is a flowchart of an example of a procedure for data reception processing by the information processing apparatus (STA1) 201 according to the second embodiment of the present technology. For reference, the procedure is similarly applicable to the operations of the other information processing apparatuses (STAB).

The control unit of the information processing apparatus (STA1) 201 determines whether multicast packets have been received from the information processing apparatus (AP) 100 (step S841). In a case where no multicast packets have yet been received, the control unit continues monitoring.

In a case where multicast packets have been received from the information processing apparatus (AP) 100 (step S841), the control unit of the information processing apparatus (STA1) 201 determines whether delivery acknowledgment in the MU resource bitmap and packet number assignments to channel resources have been received from the information processing apparatus (AP) 100 (step S842). In a case where the information has not yet been received, the control unit continues monitoring.

In a case where the information has been received from the information processing apparatus (AP) 100 (step S842), the control unit of the information processing apparatus (STA1) 201 transmits the delivery acknowledgment in the MU resource bitmap (step S843). For reference, in a case where all the multicast packets transmitted by the information processing apparatus (AP) 100 have been successfully received, the control unit does not transmit delivery acknowledgment in the MU resource bitmap.

Subsequently, the control unit of the information processing apparatus (STA1) 201 receives a packet as re-transmission target from the information processing apparatus (AP) 100 (step S844).

3. Third Embodiment

A third embodiment of the present technology has another example of channel resource assignments. That is, some of the plurality of channel resources are equally assigned to two or more information processing apparatuses (STAs), and others of the plurality of channel resources are independently assigned to each of the information processing apparatuses (STAB).

For reference, configurations of the apparatuses in the third embodiment of the present technology are almost identical to those of the information processing apparatus (AP) 100 and the information processing apparatuses (STA1) 201 to (STA3) 203 illustrated in FIGS. 1, 2, and others. Accordingly, the components in common with the first embodiment of the present technology will be given the same reference signs as those in the first embodiment of the present technology, and descriptions thereof will be partially omitted.

[Example of Channel Resource Assignments]

First, descriptions will be given as to an example in which the method for channel resource assignments in the first embodiment of the present technology and the method for channel resource assignments in the second embodiment of the present technology are used simultaneously. That is, descriptions will be given as to an example in which the method by which to collect information separately from the plurality of information processing apparatuses (STAs) in the first embodiment of the present technology and the method by which to collect bitmap information as logical sum from each of the information processing apparatuses (STAs) in the second embodiment of the present technology are used simultaneously.

Figure 19:
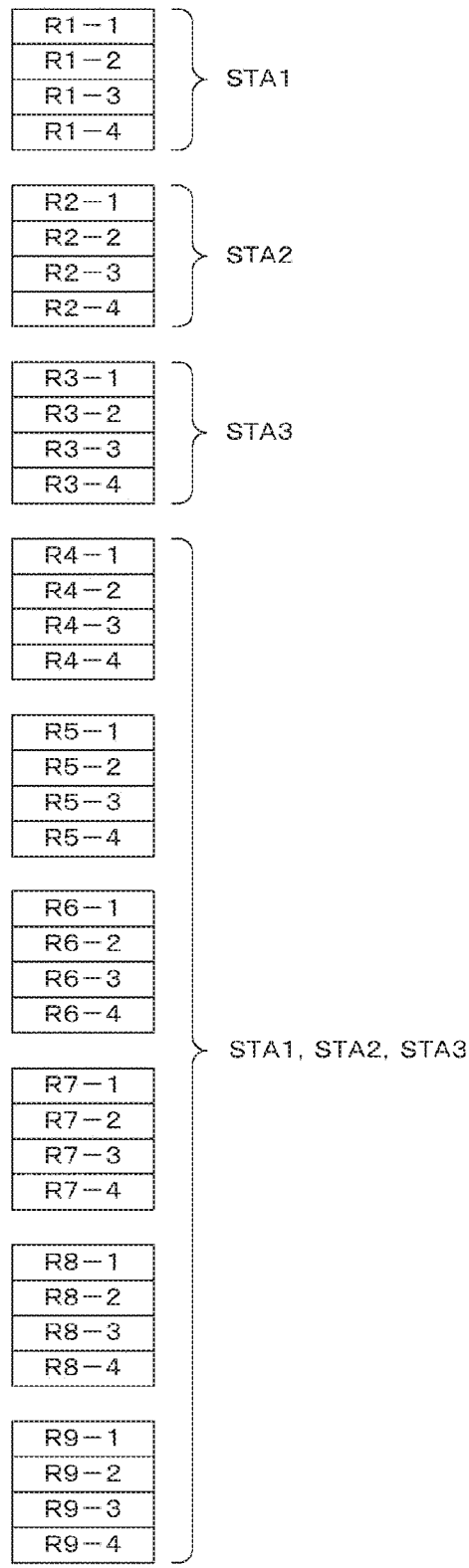
FIG. 19 is a diagram illustrating an example of channel resource assignments by the information processing apparatus (AP) 100 according to a third embodiment of the present technology.

FIG. 19 is a diagram illustrating an example of channel resource assignments by the information processing apparatus (AP) 100 according to a third embodiment of the present technology. Specifically, FIG. 19 illustrates an example of assignment method by which some of channel resources are equally assigned to two or more information processing apparatuses (STAs) and others of the channel resources are independently assigned to each of the information processing apparatuses (STAs), and notification of the assignments is provided.

According to the assignment method illustrated in FIG. 19, it is possible to collect a plurality of bits of information separately from each of the information processing apparatuses (STAs) by using some of channel resources and collect bitmap information as logical sum from each of the information processing apparatuses (STAs) by using others of the channel resources.

Specifically, it is possible to collect pluralities of bits of information separately from the information processing apparatus (STA1) by using the channel resources R1-1 to R1-4. Similarly, it is possible to collect pluralities of bits of information separately from the information processing apparatus (STA2) by using the channel resources R2-1 to R2-4, and collect pluralities of bits of information separately from the information processing apparatus (STA3) by using the channel resources R3-1 to R3-4. In addition, as well as collecting the foregoing information, it is possible to collect bitmap information as logical sum from each of the information processing apparatuses (STA1) 201 to (STA3) 203 by using the channel resources R4-1 to R9-4.

In this manner, the control unit 150 of the information processing apparatus (AP) 100 can assign some of a plurality of channel resources to two or more information processing apparatuses (STAs) and assign others of the channel resources independently to a plurality of information processing apparatuses (STAs).

[Another Example of Channel Resource Assignments]

Next, descriptions will be given as to an example of assignment method that would be effective in a case where the number of channel resources is insufficient to the information processing apparatuses (STAs) according to the assignment method in the first embodiment of the present technology.

Figure 20:
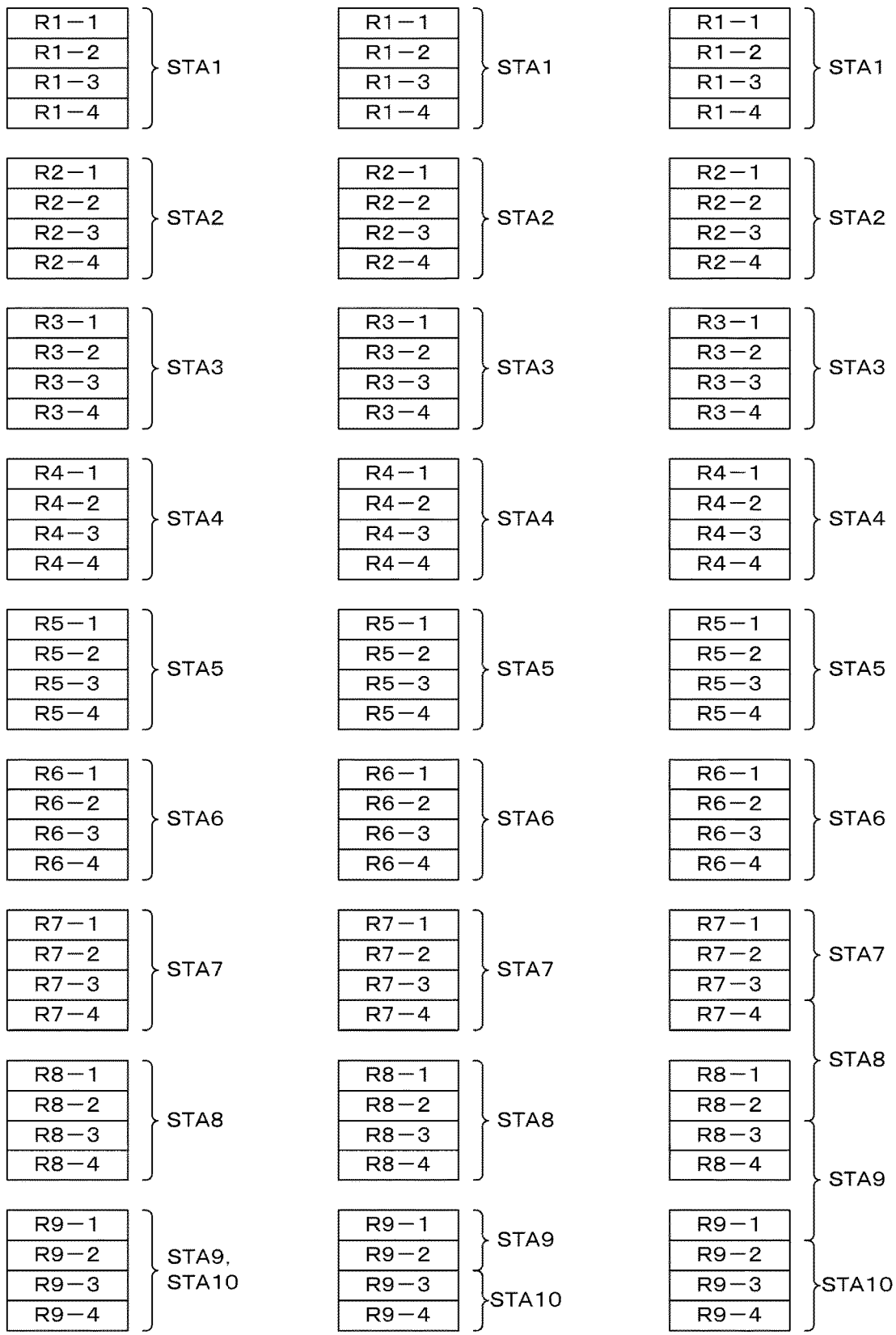
FIGS. 20a, 20b, and 20c are diagrams illustrating an example of channel resource assignments by the information processing apparatus (AP) 100 according to the third embodiment of the present technology.

FIGS. 20a, 20b, and 20c are diagrams illustrating an example of channel resource assignments by the information processing apparatus (AP) 100 according to the third embodiment of the present technology. Illustrated in FIGS. 20a, 20b, and 20c is an example of assignments in which, in a case where the number of channel resources is insufficient to the information processing apparatuses (STAs), different information processing apparatuses (STAs) are assigned to some identical channel resources.

According to the assignment method illustrated in FIGS. 20a, 20b, and 20c, pluralities of bits of information are collected separately from some of the information processing apparatuses (STAs) by using some of channel resources, and an insufficient number of channel resources are shared between the remaining information processing apparatuses (STAs).

Specifically, in the examples illustrated in FIGS. 20a and 20b, pluralities of bits of information are collected separately from the information processing apparatuses (STA1) to (STA8) by using the channel resources R1-1 to R8-1. In addition, the channel resources R9-1 to R9-4 are shared between the remaining information processing apparatuses (STA9) and (STA10).

In this manner, in a case where the channel resources R9-1 to R9-4 are shared, it is possible to collect information as logical sum as illustrated in FIG. 20a.

In addition, as illustrated in FIG. 20b, the shared channel resources R9-1 to R9-4 may be divided to transmit information on a rougher granularity.

In addition, as illustrated in FIG. 20c, it is assumed that the channel resources R1-1 to R6-4 are assigned to the information processing apparatuses (STA1) to (STAG) as normal. In this case, the channel resources R7-1 to R9-4 may be assigned to the information processing apparatuses (STA7) to (STA10) on a lower granularity.

These assignment methods may be changed as appropriate depending on communication environments. For example, in a case where the information processing apparatus (AP) 100 detects an information processing apparatus (STA) less responsive than standard, the information processing apparatus (AP) 100 can change the channel resources by increasing channel resource assignments to the information processing apparatus (STA) or the like. Alternatively, the information processing apparatus (AP) 100 may change channel resource assignments to the information processing apparatus (STA) by changing the assignment method, for example.

4. Fourth Embodiment

In a fourth embodiment of the present technology, the information processing apparatus (AP) provides information to the information processing apparatuses (STAs) by using the MU resource bitmap.

For reference, configurations of the apparatuses in the fourth embodiment of the present technology are almost identical to those of the information processing apparatus (AP) 100 and the information processing apparatuses (STA1) 201 to (STA3) 203 illustrated in FIGS. 1, 2, and others. Accordingly, the components in common with the first embodiment of the present technology will be given the same reference signs as those in the first embodiment of the present technology, and descriptions thereof will be partially omitted.

In the fourth embodiment of the present technology, the simplified frame format used in the first to third embodiments of the present technology can be used as well. However, the frame format is not limited to this but another frame format may be used instead.

In addition, like the first embodiment of the present technology, the MU resource bitmap includes total M×N channel resources R1-1 to RM-N at a maximum as an example. In the following description, however, total 36 channel resources with M=9 and N=4 exist as an example, for the ease of explanation.

For example, the information provided by the information processing apparatus (AP) 100 to the information processing apparatuses (STAs) by using the MU resource bitmap (provided information) may be the same as the information transmitted in a general bitmap. For example, a partial virtual bitmap (PVB) field of a traffic indication map (TIM) element in a beacon frame may be set as provided information.

Here, the wireless LAN standardizing organization IEEE 802.11 has proposed a technology for reducing power consumption by which, when there is no need for an information processing apparatus to communicate, the information processing apparatus shifts from an awake state of performing normal operations to a power-saving state (doze state) of transmitting and receiving no signals. According to this technology, a slave machine in the power-saving state enters the awake state at constant intervals to check from a signal (TIM) from a base station whether data to the subject machine is buffered at the base station. In this manner, in a case where there exists a slave machine that cannot receive packets in the power-saving state, it is necessary to notify regularly the slave machine that packets are buffered at the base station. PVB is used as a field for the notification. Hereinafter, an example of using a PVB as a notifying bitmap will be described.

[Frame Format Example of Beacon]

Figure 21:
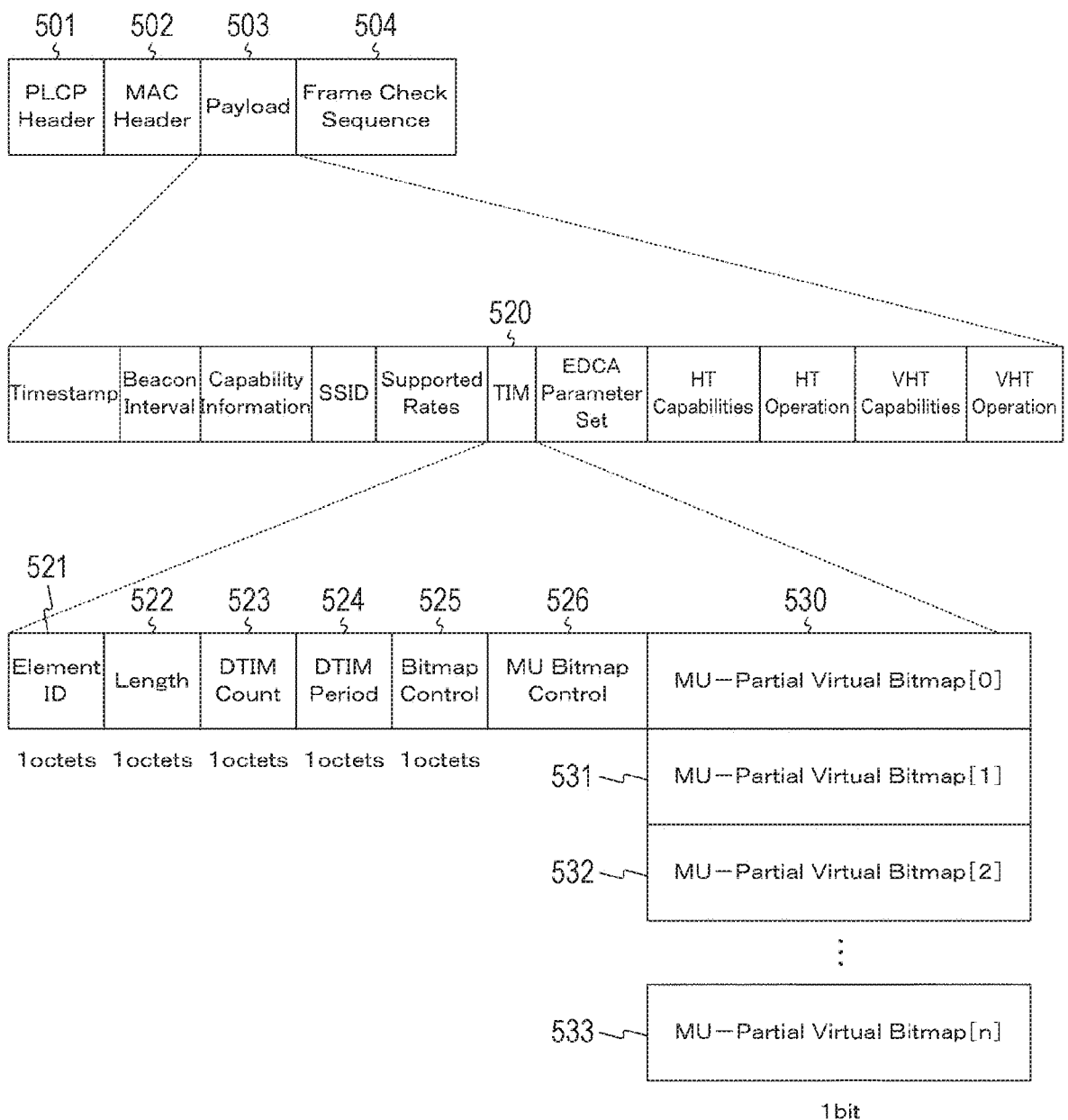
FIG. 21 is a diagram illustrating an example of frame format of a beacon exchanged between devices constituting the communication system 10 according to a fourth embodiment of the present technology.

FIG. 21 is a diagram illustrating an example of a frame format of a beacon exchanged between devices constituting the communication system 10 according to the fourth embodiment of the present technology. This beacon is used in the example illustrated in FIG. 22.

FIG. 21 illustrates an example of a partially modified frame format of a beacon defined by IEEE Std. 802.11 2012 and IEEE Std. 802.11ac 2013. Specifically, FIG. 21 illustrates an example in which partial virtual bitmaps (PVB) are multiplexed on the basis of the frame format of the beacon to form the bitmaps in the direction of channel resources.

The beacon illustrated in FIG. 21 includes a physical layer convergence protocol (PLCP) header 501, a media access control (MAC) header 502, a payload 503, and a frame check sequence (FCS) 504. The payload 503 includes a traffic indication map (TIM) 520.

The TIM 520 includes element ID 521, length 522, DTIM count 523, DTIM period 524, bitmap control 525, MU bitmap control 526, and MU-partial virtual bitmap [0] 530 to MU-partial virtual bitmap [n] 533.

In this manner, in the example illustrated in FIG. 21, a new field (MU bitmap control 526) is prepared. Then, the new field (MU bitmap control 526) notifies that the subsequent PVBs are MU-PVBs using bitmaps formed by multiplexing in the direction of channel resources. For reference, the position of the new field (MU bitmap control 526) is not limited to the position illustrated in FIG. 21.

In addition, in the example illustrated in FIG. 21, the vertical stacking of rectangles (MU-partial virtual bitmap [0] 530 to MU-partial virtual bitmap [n] 533) means multiplexing.

The element ID 521 contains an ID indicating IE notifying that trigger multiplexing transmission is executed.

The length 522 contains information indicating the data length of the frame of the TIM 520.

The DTIM count 523 contains information indicating the beacon count before the next beacon.

The DTIM period 524 contains information indicating the value for setting the timing for transmitting the data buffered at the base station (the information processing apparatus (AP) 100).

The bitmap control 525 contains information regarding the next field.

The MU bitmap control 526 contains information indicating that the subsequent fields are MU-PVBs using bitmaps formed by multiplexing in the direction of channel resources.

The MU-partial virtual bitmap [0] 530 to MU-partial virtual bitmap [n]533 contain information equivalent to PVBs. The information may be one bit, for example.

Here, it is assumed that the number of data destinations (the information processing apparatuses (STAs)) held in the information processing apparatus (AP) 100 may exceed the maximum number of MU channel resources. In this case, the MU-PVB may be divided into two or more and then coupled, and the MU bitmap control 526 may provide notification of that state.

[Examples of Notification of PVBs (MU-PVBs) Using the MU Resource Bitmap]

Figure 22:
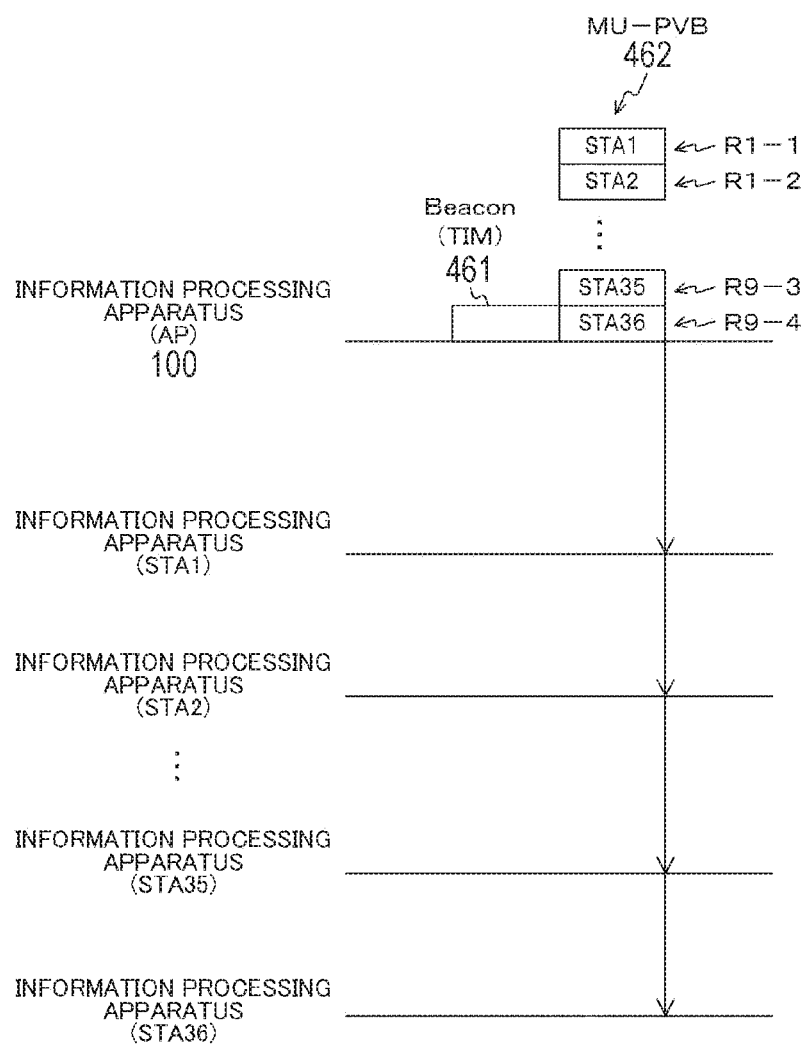
FIG. 22 is a diagram illustrating an example in which the information processing apparatus (AP) 100 notifies the information processing apparatuses (STAs) of PVBs by using the MU resource bitmap according to the fourth embodiment of the present technology.
Figure 23:
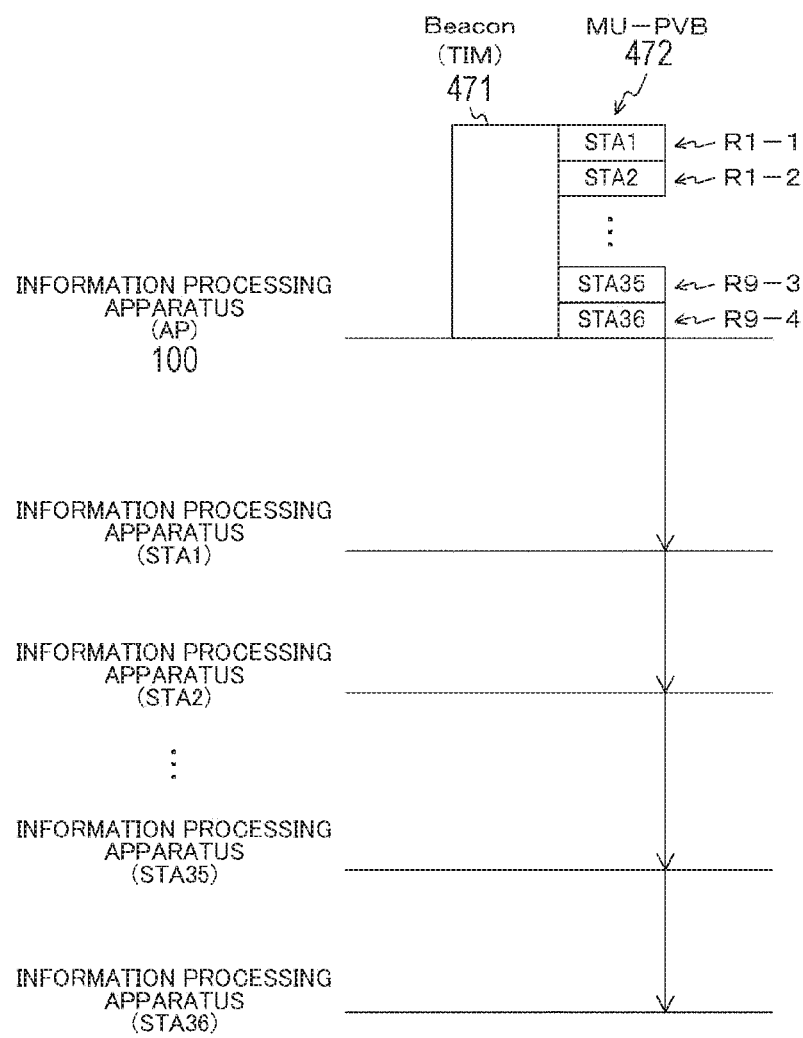
FIG. 23 is a diagram illustrating an example in which the information processing apparatus (AP) 100 notifies the information processing apparatuses (STAs) of PVBs by using the MU resource bitmap according to the fourth embodiment of the present technology.
Figure 24:
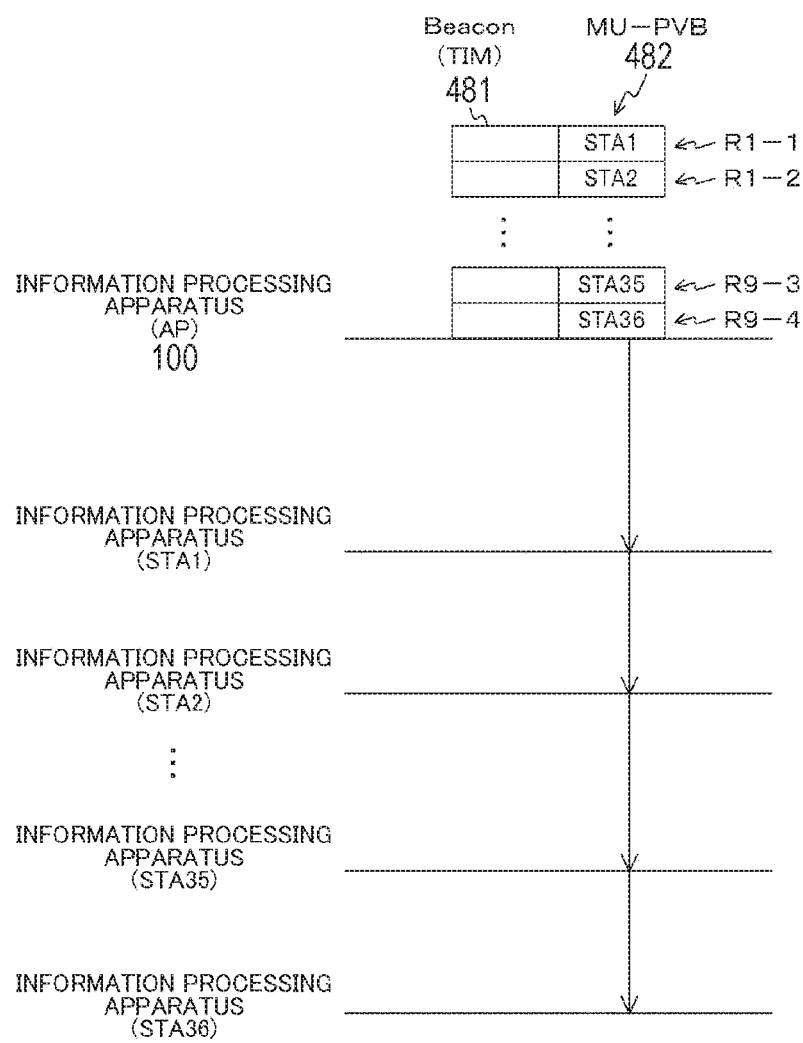
FIG. 24 is a diagram illustrating an example in which the information processing apparatus (AP) 100 notifies the information processing apparatuses (STAs) of PVBs by using the MU resource bitmap according to the fourth embodiment of the present technology.

FIGS. 22 to 24 are diagrams illustrating examples in which the information processing apparatus (AP) 100 notifies the information processing apparatuses (STAs) of PVBs by using the MU resource bitmap according to the fourth embodiment of the present technology. In addition, in the fourth embodiment of the present technology, the PVBs using the MU resource bitmap will be called MU-PVBs.

As illustrated in FIG. 21, notification of the MU-PVBs is provided in the beacon frame. Here, the beacon is generally provided by using only some of frequency channels or spatial channels.

Thus, the beacon illustrated in FIG. 21 excluding the MU-PVB portions (including the TIM) is transmitted by using some of channels. In addition, the MU-PVB portions are multiplexed and transmitted. FIG. 22 illustrates this example.

FIG. 22 illustrates an example in which the beacon 461 excluding the MU-PVB 462 is transmitted by using the channel resource R9-4, and the MU-PVBs 462 are transmitted by using the channel resources R1-1 to R9-4.

Furthermore, although FIG. 22 illustrates an example in which the MU-PVBs 462 are transmitted after transmission of the beacon 461, the transmission order is not limited to this.

In addition, the portion of the beacon other than the MU-PVBs may provide notification as to which of the information processing apparatuses (STAs) the channel resources to be used later for the MU-PVBs are assigned to.

FIG. 23 illustrates an example in which a beacon 471 excluding MU-PVBs 472 (including TIM) is transmitted by using all channel resources. In this case, the beacon 471 is transmitted by using all the channel resources, which shorten the transmission time of the beacon 471.

FIG. 24 illustrates an example in which a beacon 481 including MU-PVBs 482 represented by only a small amount of information (for example, one bit) is transmitted by separately using the channel resources.

In this manner, the control unit 150 of the information processing apparatus (AP) 100 can perform a control to transmit a plurality of signals to a plurality of information processing apparatuses (STAs) by using a plurality of channel resources. That is, the control unit 150 of the information processing apparatus (AP) 100 can perform a control to transmit the plurality of signals to provide one or more pieces of information formed by the plurality of signals (for example, bitmap information) to the plurality of information processing apparatuses (STAs). For example, the control unit 150 of the information processing apparatus (AP) 100 can use the one or more pieces of information (for example, MU-PVBs) to provide the information regarding the information processing apparatuses (STAs) on which data is accumulated in the information processing apparatus (AP) 100. The plurality of signals can be transmitted as part of a beacon or a coupled or separate frame, for example.

Here, the maximum number of channel resources that can be handled by a device capable of simultaneous multiplexing by OFDMA and MIMO refers to the product of the numbers of channel resources. In addition, a general frame format can be simplified into a frame that includes only a header and can contain a very small amount of information (for example, one bit), for example. With a combination of them, it is possible to communicate a small amount of information with small overhead to a plurality of devices. In addition, one kind of multiuser (MU) channel resource bitmap can be efficiently used. With this arrangement, it is possible to collect delivery acknowledgement and information from the plurality of information processing apparatuses (STAs) with small overhead in a simplified manner.

In this manner, it is possible to collect delivery acknowledgement and information regarding reception status from the plurality of information processing apparatuses (STAs) with small overhead in a simplified manner, thereby improving the quality of multicast communications. In other words, it is possible to reduce overhead caused by the multicast delivery acknowledgment and reduce the overhead caused by the transmission of information regarding reception status. With this arrangement, it is possible to speed up wireless communications and improve the communication quality.

In addition, adding a redundant signal improves robustness and achieves dispersion of risk.

In this manner, according to the embodiment of the present technology, it is possible to implement signaling using the MU resource bitmap. In addition, it is possible to reduce the overhead and enhance the communication quality, thereby allowing proper wireless communications.

5. Application Examples

The technology according to the present disclosure is applicable to a variety of products. For example, the information processing apparatus (AP) 100 and the information processing apparatuses (STAs) may be implemented as mobile terminals such as smartphones, tablet personal computers (PCs), note PCs, portable game terminals, or digital cameras, stationary terminals such as television sets, printers, digital scanners, or network storage, or in-vehicle terminals such as car navigation systems. In addition, the information processing apparatus (AP) 100 and the information processing apparatuses (STAs) may be implemented as terminals performing machine-to-machine (M2M) communications such as smart meters, automatic vendor machines, remote monitoring systems, or point-of-sale (POS) terminals (also called machine-type communication (MTC) terminals). Furthermore, the information processing apparatus (AP) 100 and the information processing apparatuses (STAs) may be wireless communication modules installed in these terminals (for example, integrated circuit modules formed by one each die).

Alternatively, for example, the information processing apparatus (AP) 100 may be implemented as a wireless LAN access point (also called wireless base station) with or without router function. In addition, the information processing apparatus (AP) 100 may be implemented as a mobile wireless LAN router. Furthermore, the information processing apparatus (AP) 100 may be a wireless communication module mounted in these device (for example, an integrated circuit module formed by one die).

5-1. First Application Example

Figure 25:
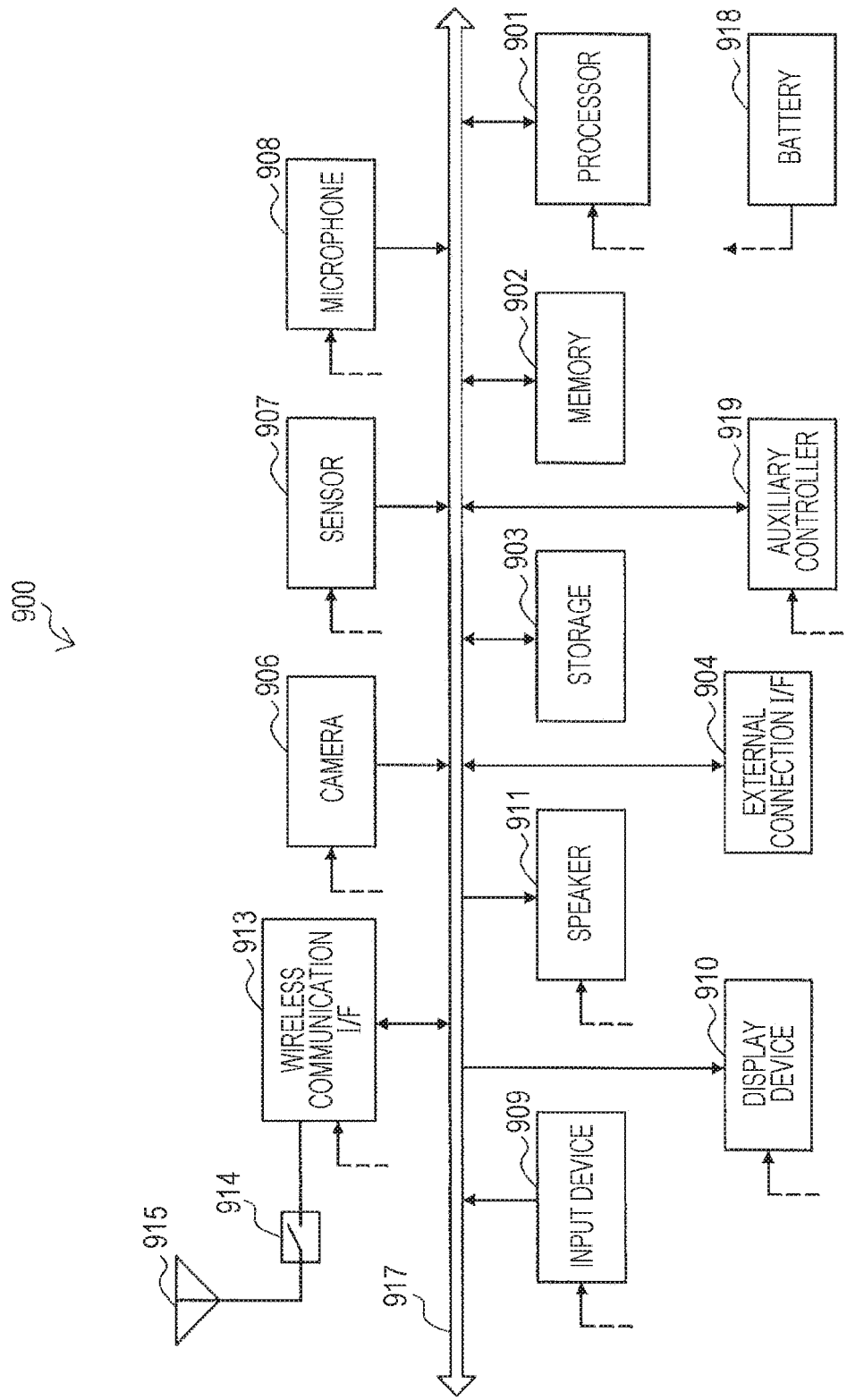
FIG. 25 is a block diagram illustrating a schematic configuration example of a smartphone.

FIG. 25 is a block diagram illustrating a schematic configuration example of a smartphone 900 to which the technology according to the present disclosure is applicable. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be a central processing unit (CPU) or a system-on-chip (SoC), for example, to control the functions of an application layer and other layers of the smartphone 900. The memory 902 includes a random access memory (RAM) and a read only memory (ROM) to store programs and data executed by the processor 901. The storage 903 may include a storage medium such as a semiconductor memory or a hard disc. The external connection interface 904 is an interface to connect an external device such as a memory card or a universal serial bus (USB) device to the smartphone 900.

The camera 906 has an imaging element such as a charge coupled device (CCD) or a complementary metal oxide semiconductor (CMOS), for example, to generate photographed images. The sensor 907 may include a sensor group of a positioning sensor, a gyro sensor, a geomagnetic sensor, and an acceleration sensor, for example. The microphone 908 converts sounds input to the smartphone 900 into audio signals. The input device 909 includes a touch sensor that detects a touch on the screen of the display device 910, a key pad, a keyboard, and buttons or switches, for example, to accept operations or information input by the user. The display device 910 has a screen of a liquid crystal display (LCD), an organic light-emitting diode (OLED) display, or the like to display output images of the smartphone 900. The speaker 911 converts the audio signals output from the smartphone 900 into sounds.

The wireless communication interface 913 supports one or more of wireless LAN standards such as IEEE802.11a, 11b, 11g, 11n, 11ac, and 11ad to execute wireless communications. The wireless communication interface 913 can communicate with other apparatuses via wireless LAN access points in an infrastructure mode. In addition, the wireless communication interface 913 can communicate directly with other apparatuses in a direct communication mode such as ad hoc mode or Wi-Fi Direct. Note that in Wi-Fi Direct, one of two terminals acts as an access point unlike in the ad hoc mode, but communications are directly conducted between the two terminals. The wireless communication interface 913 may include typically a baseband processor, a radio frequency (RF) circuit, a power amplifier, and the like. The wireless communication interface 913 may be a one-chip module in which a memory storing a communication control program and a processor and related circuitry executing the program are integrated. Besides the wireless LAN system, the wireless communication interface 913 may support other kinds of wireless communication system such as near-field communication system, proximity communication system, or cellular communication system. The antenna switch 914 switches the connection destination of the antenna 915 among a plurality of circuits included in the wireless communication interface 913 (for example, circuits for different wireless communication systems). The antenna 915 has a single or a plurality of antenna elements (for example, a plurality of antenna elements constituting an MIMO antenna) that is used by the wireless communication interface 913 to transmit and receive wireless signals.

For reference, the smartphone 900 is not limited to the example of FIG. 25 but may include a plurality of antennas (for example, a wireless LAN antenna, a proximity communication antenna, and the like). In that case, the antenna switch 914 may be omitted from the configuration of the smartphone 900.

The bus 917 connects together the processor 901, the memory 902, the storage 903, the external connection interface 904, the camera 906, the sensor 907, the microphone 908, the input device 909, the display device 910, the speaker 911, the wireless communication interface 913, and the auxiliary controller 919. The battery 918 supplies power to respective blocks of the smartphone 900 illustrated in FIG. 25 via power lines partially illustrated by broken lines in the drawing. The auxiliary controller 919 implements the minimum necessary functions of the smartphone 900, for example, in a sleep mode.

In the smartphone 900 illustrated in FIG. 25, the control unit 150 described above with reference to FIG. 2 may be implemented by the wireless communication interface 913. In addition, at least some of these functions may be implemented by the processor 901 or the auxiliary controller 919. For example, assigning a plurality of channel resources to a plurality of devices and receiving signals transmitted by using the plurality of channel resources (simplified signals) makes it possible to reduce power consumption of the battery 918.

For reference, the smartphone 900 may operate as a wireless access point (software AP) by the processor 901 executing an access point function in an application level. Alternatively, the wireless communication interface 913 may have a wireless access point function.

5-2. Second Application Example

Figure 26:
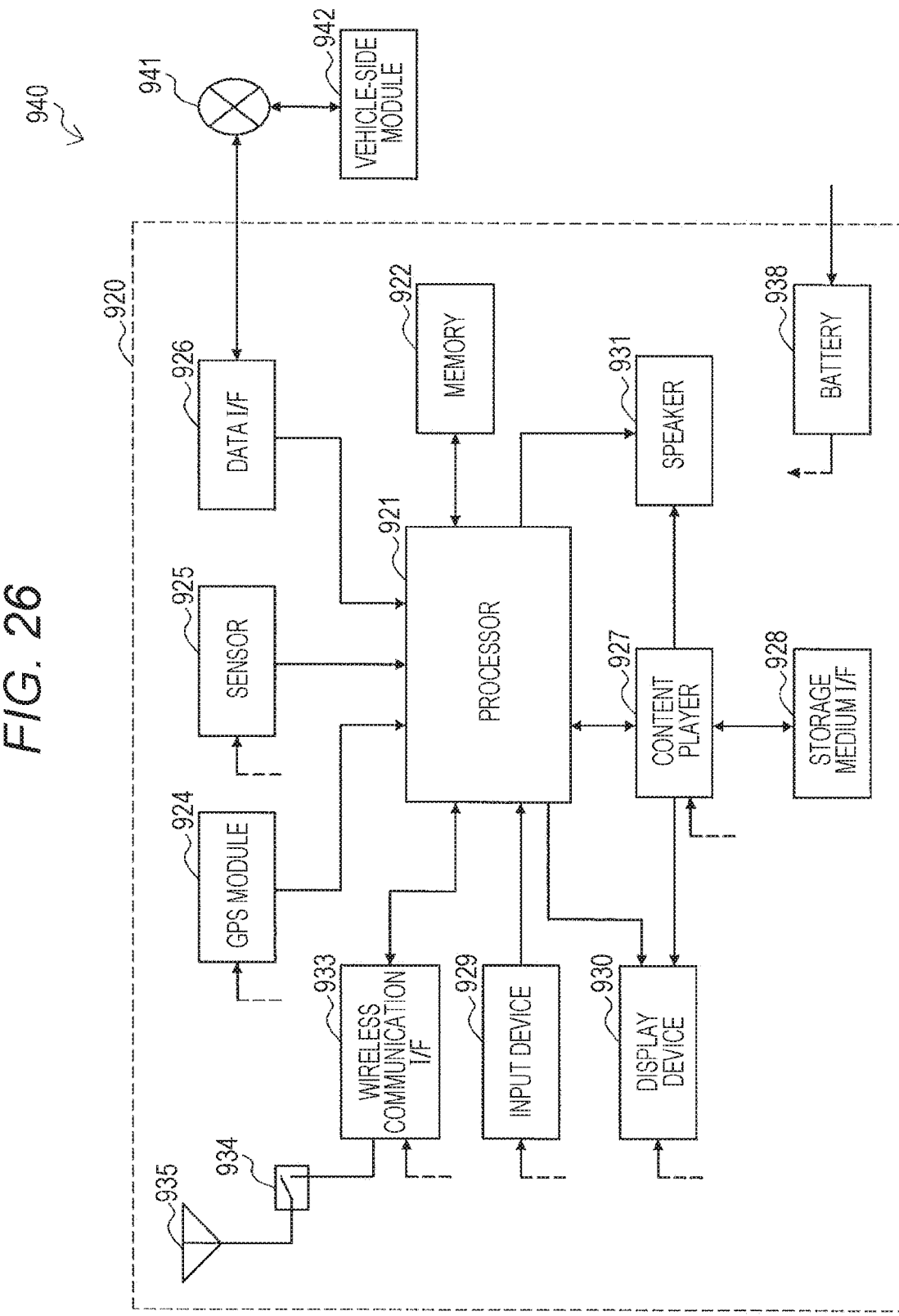
FIG. 26 is a block diagram illustrating a schematic configuration example of a car navigation system.

FIG. 26 is a block diagram illustrating a schematic configuration example of a car navigation system 920 to which the technology according to the present disclosure is applicable. The car navigation system 920 includes a processor 921, a memory 922, a global positioning system (GPS) module 924, a sensor 925, a data interface 926, a contents player 927, a storage medium interface 928, an input device 929, a display device 930, a speaker 931, a wireless communication interface 933, an antenna switch 934, an antenna 935, and a battery 938.

The processor 921 may be a CPU or SoC, for example, that controls a navigation function and other functions of the car navigation system 920. The memory 922 includes a RAM and a ROM to store programs and data executed by the processor 921.

The GPS module 924 uses a GPS signal received by a GPS satellite to measure the location of the car navigation system 920 (for example, the latitude, longitude, and height). The sensor 925 may include a sensor group of a gyro sensor, a geomagnetic sensor, and a pressure sensor, for example. The data interface 926 is connected to an in-vehicle network 941 via a terminal not illustrated, for example, to acquire data generated at the vehicle such as vehicle speed data.

The contents player 927 replays the contents stored in a storage medium (for example, a CD or DVD) inserted into the storage medium interface 928. The input device 929 includes a touch sensor that detects a touch on the screen of the display device 930, buttons, or switches, for example, to accept operation or information input from the user. The display device 930 has a screen of an LCD, OLED display, or the like to display images of the navigation function or contents replayed. The speaker 931 outputs the sounds of the navigation function or contents replayed.

The wireless communication interface 933 supports one or more of wireless LAN standards such as IEEE802.11a, 11b, 11g, 11n, 11ac, and 11ad to execute wireless communications. The wireless communication interface 933 can communicate with other apparatuses via wireless LAN access points in an infrastructure mode. In addition, the wireless communication interface 933 can communicate directly with other apparatuses in a direct communication mode such as ad hoc mode or Wi-Fi Direct. The wireless communication interface 933 may include typically a baseband processor, a RF circuit, a power amplifier, and the like. The wireless communication interface 933 may be a one-chip module in which a memory storing a communication control program and a processor and related circuitry executing the program are integrated. Besides the wireless LAN system, the wireless communication interface 933 may support other kinds of wireless communication system such as near-field communication system, proximity communication system, or cellular communication system. The antenna switch 934 switches the connection destination of the antenna 935 among a plurality of circuits included in the wireless communication interface 933. The antenna 935 has a single or a plurality of antenna elements that is used by the wireless communication interface 933 to transmit and receive wireless signals.

For reference, the car navigation system 920 is not limited to the example of FIG. 26 but may include a plurality of antennas. In that case, the antenna switch 934 may be omitted from the configuration of the car navigation system 920.

The battery 938 supplies power to respective blocks of the car navigation system 920 illustrated in FIG. 26 via power lines partially illustrated by broken lines in the drawing. In addition, the battery 938 accumulates power supplied from the vehicle side.

In the car navigation system 920 illustrated in FIG. 26, the control unit 150 described above with reference to FIG. 2 may be implemented in the wireless communication interface 933. In addition, at least some of these functions may be implemented by the processor 921.

In addition, the wireless communication interface 933 may act as the information processing apparatus (AP) 100 described above to provide wireless connection to the terminal of the user on the vehicle.

In addition, the technology according to the present disclosure may be implemented as in-vehicle system (or vehicle) 940 including one or more blocks of the car navigation system 920, the in-vehicle network 941, and a vehicle-side module 942 described above. The vehicle-side module 942 generates vehicle-side data such as vehicle speed, engine speed, or failure information, and outputs the generated data to the in-vehicle network 941.

5-3. Third Application Example

Figure 27:
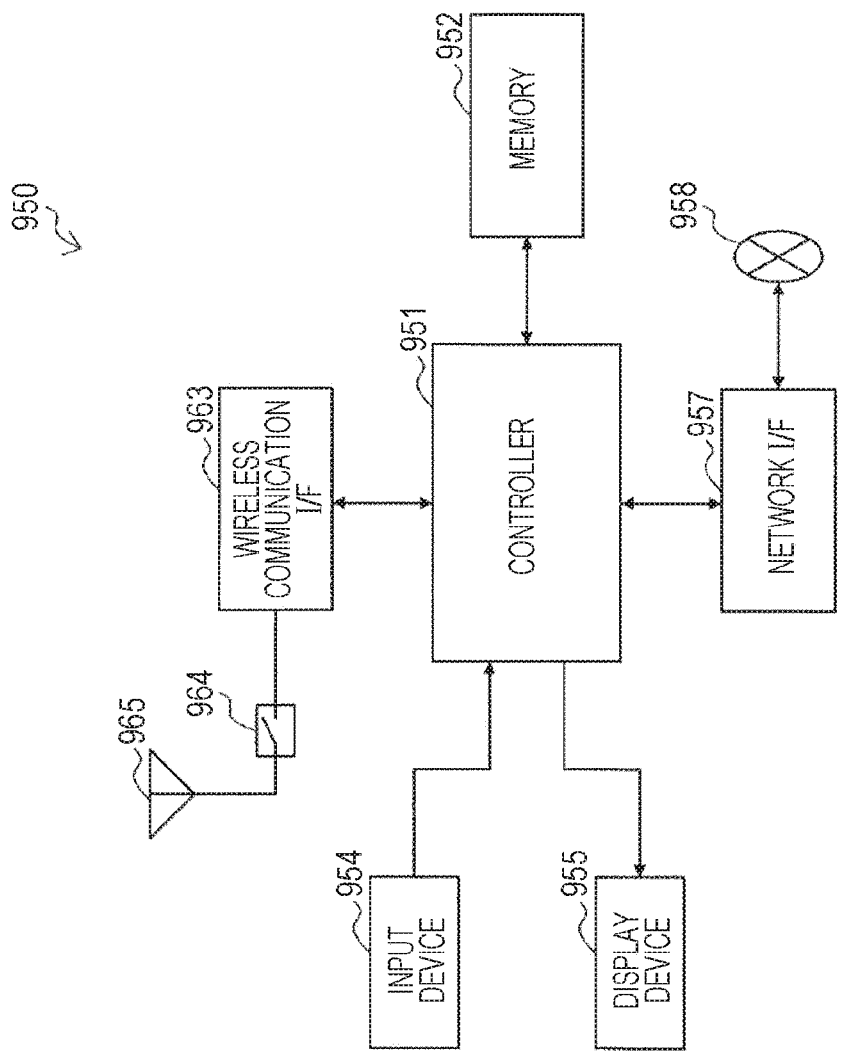
FIG. 27 a block diagram illustrating a schematic configuration example of a wireless access point.

FIG. 27 a block diagram illustrating a schematic configuration example of a wireless access point 950 to which the technology according to the present disclosure is applicable. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) to implement various functions of an internet protocol (IP) layer and higher-level layers of the wireless access point 950 (for example, access restriction, routing, encryption, fire wall, log management, and the like). The memory 952 includes a RAM and a ROM to store a program executed by the controller 951 and various control data (for example, terminal list, routing table, encryption key, security setting, log, and the like).

The input device 954 includes buttons or switches, for example, to accept user operations. The display device 955 includes an LED lamp and the like to display operation status of the wireless access point 950.

The network interface 957 is a wired communication interface for the wireless access point 950 to connect to a wired communication network 958. The network interface 957 may have a plurality of connection terminals. The wired communication network 958 may be an LAN such as Ethernet (registered trademark) or a wide area network (WAN).

The wireless communication interface 963 supports one or more of wireless LAN standards such as IEEE802.11a, 11b, 11g, 11n, 11ac, and 11ad to act as an access point and provide wireless connection to neighboring terminals. The wireless communication interface 963 may include typically a baseband processor, a RF circuit, a power amplifier, and the like. The wireless communication interface 963 may be a one-chip module in which a memory storing a communication control program and a processor and related circuitry executing the program are integrated. The antenna switch 964 switches the connection destination of the antenna 965 among a plurality of circuits included in the wireless communication interface 963. The antenna 965 has a single or a plurality of antenna elements that is used by the wireless communication interface 963 to transmit and receive wireless signals.

In the wireless access point 950 illustrated in FIG. 27, the control unit 150 described above with reference to FIG. 2 may be implemented in the wireless communication interface 963. In addition, at least some of these functions may be implemented by the controller 951.

For reference, the foregoing embodiment is an example for embodying the present technology, and the matters in the embodiment and the matters specifying the invention in the claims correspond to each other. Similarly, the matters specifying the invention in the claims and the matters given the same designations as those of the matters in the claims in the embodiment of the present technology correspond to each other. However, the present technology is not limited to the embodiment but can be embodied by making various modifications to the embodiment without deviating from the gist of the present technology.

In addition, the processing steps described above in relation to the embodiment may be regarded as a method having the series of steps or may be regarded as a program for causing a computer to execute the series of steps or a recording medium storing the program. The recording medium may be a compact disc (CD), mini disc (MD), digital versatile disc (DVD), memory card, Blue-ray (registered trademark) disc, or the like, for example.

Furthermore, the advantageous effects described herein are mere examples and are not limited ones. In addition, the present technology may have any other advantageous effect.

For reference, the present technology may be configured as follows:

(1)

An information processing apparatus including a control unit configured to perform a control to assign a plurality of channel resources for wireless communications to a plurality of devices and notify the plurality of devices of the assignments.

(2)

The information processing apparatus according to (1), further including a communication unit configured to receive signals transmitted by the devices by using the plurality of channel resources assigned to the devices, on each of the plurality of channel resources, in which the control unit acquires one or more pieces of information formed by the plurality of signals received on each of the plurality of channel resources.

(3)

The information processing apparatus according (1) or (2), in which the control unit performs a control to provide information regarding a transmission condition to the plurality of devices, and cause the plurality of devices to transmit the signals on the basis of the provided information.

(4)

The information processing apparatus according to any one of (1) to (3), in which the plurality of channel resources includes combinations of frequency channel resources and spatial channel resources.

(5)

The information processing apparatus according to any one of (1) to (4), in which the control unit performs a control to notify that signals in a simplified frame format are transmitted by using the assigned channel resources.

(6)

The information processing apparatus according to any one of (1) to (5), in which the control unit performs a control to assign two or more channel resources to each of the devices constituting the plurality of devices.

(7)

The information processing apparatus according to (6), in which the control unit performs a control to notify the plurality of devices that signals for providing one or more pieces of information to the information processing apparatus are transmitted by using the two or more channel resources.

(8)

The information processing apparatus according to (6) or (7), in which the control unit performs a control to notify the plurality of devices that signals for providing same information to the information processing apparatus are transmitted by using different channel resources.

(9)

The information processing apparatus according to any one of (6) to (8), in which the control unit performs a control to assign same frequency channel resources or same spatial channel resources as the two or more channel resources.

(10)

The information processing apparatus according to (2), in which the control unit performs a control to cause the devices to transmit information regarding reception status of the devices as the one or more pieces of information.

(11)

The information processing apparatus according to any one of (1) to (10), in which the control unit performs a control to assign the two or more same channel resources of the plurality of channel resources to each of the plurality of devices.

(12)

The information processing apparatus according to (11), in which, on the basis of reception power of signals transmitted by using the same channel resources, the control unit determines a number of devices, out of the plurality of devices, that have transmitted the signals.

(13)

The information processing apparatus according to (11) or (12), in which the control unit performs a control to cause the plurality of devices to transmit signals for providing notification of results of reception of multicast transmission to the plurality of devices by using the same channel resources.

(14)

The information processing apparatus according to any one of (1) to (10), in which the control unit performs a control to assign some of the plurality of channel resources to two or more devices constituting the plurality of devices, and assign others of the channel resources independently to the plurality of devices.

(15)

The information processing apparatus according to any one of (1) to (14), in which the control unit performs a control to provide information necessary for the devices to transmit signals by using the plurality of assigned channel resources.

(16)

An information processing apparatus including a control unit configured to perform a control to transmit a plurality of signals to a plurality of devices by using a plurality of channel resources for wireless communications to provide one or more pieces of information formed by the plurality of signals to the plurality of devices.

(17)

The information processing apparatus according to (16), in which the control unit provides information regarding the devices on which data is accumulated in the information processing apparatus by using the one or more pieces of information.

(18)

An information processing apparatus including a control unit configured to, upon receipt of a notification that a plurality of channel resources for wireless communications is assigned to the information processing apparatus, perform a control to transmit to other devices a plurality of signals for providing predetermined information to the other devices by using the plurality of assigned channel resources.

(19)

The information processing apparatus according to (18), in which the control unit performs a control to transmit signals in a simplified frame format by using the plurality of assigned channel resources.

(20)

A communication system including:

a first information processing apparatus configured to assign a plurality of channel resources for wireless communications to a plurality of second information processing apparatuses and notify the plurality of second information processing apparatuses of the assignments; and the second information processing apparatuses configured to, upon receipt of the notification, transmit to the first information processing apparatus a plurality of signals for providing predetermined information to the first information processing apparatus by using the plurality of assigned channel resources.

(21)

An information processing method including a control step of assigning a plurality of channel resources for wireless communications to a plurality of devices and notifying the plurality of devices of the assignments.

(22)

An information processing method including a control step of transmitting a plurality of signals to a plurality of devices by using a plurality of channel resources for wireless communications to provide one or more pieces of information formed by the plurality of signals to the plurality of devices.

(23)

An information processing method including a control step of, in a case where a notification is received that a plurality of channel resources for wireless communications is assigned to the information processing apparatuses, transmitting to another device a plurality of signals for providing predetermined information to the other device by using the plurality of assigned channel resources.

INDUSTRIAL APPLICABILITY

Reference Signs List

10 Communication system
100 Information processing apparatus (AP)
110 Data processing unit
120 Communication unit
121 Modulation and demodulation unit
122 Signal processing unit
123, 124 Wireless interface unit
125, 126 Amplifier unit
127, 128 Antenna
129 Channel estimation unit
130 Storage unit
140 Power supply unit
150 Control unit
201 Information processing apparatus (STA1)
202 Information processing apparatus (STA2)
203 Information processing apparatus (STA3)
204 Information processing apparatus (STA N)
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation system
921 Processor
922 Memory
924 GPS module
925 Sensor
926 Data interface
927 Content player
928 Storage medium interface 929 Input device
930 Display device
931 Speaker
933 Wireless communication interface
934 Antenna switch
935 Antenna
938 Battery
941 In-vehicle network
942 Vehicle-side module
950 Wireless access point
951 Controller
952 Memory
954 Input device
955 Display device
957 Network interface
958 Wired communication network
963 Wireless communication interface
964 Antenna switch
965 Antenna

What is claimed is:

1. An information processing apparatus, comprising:
circuitry configured to:
control a first assignment of a first plurality of channel resources for a first wireless communication to a first device;
control a second assignment of a second plurality of channel resources for a second wireless communication to a second device;
send a trigger frame to the first device and the second device, wherein the trigger frame includes assignment information indicating the first assignment and the second assignment;
receive first signals concurrently transmitted by the first device using the first plurality of channel resources assigned to the first device;
receive second signals concurrently transmitted by the second device using the second plurality of channel resources assigned to the second device, wherein
the first plurality of channel resources is different from the second plurality of channel resources,
each of the first plurality of channel resources is different, and
each of the second plurality of channel resources is different;
acquire first status information from the first signals received on the first plurality of channel resources;
acquire second status information from the second signals received on the second plurality of channel resources; and
provide threshold information to the first device and the second device, wherein
the threshold information is regarding a transmission condition, and
the first device and the second device transmit the first signals and the second signals, respectively, based on the threshold information.

2. The information processing apparatus according to claim 1, wherein each of the first plurality of channel resources and the second plurality of channel resources includes frequency channel resources and spatial channel resources.

3. The information processing apparatus according to claim 1, wherein the circuitry is further configured to notify the transmission of the first signals to the first device and the second signals to the second device, using the first plurality of channel resources and the second plurality of channel resources.

4. The information processing apparatus according to claim 1, wherein
the circuitry is further configured to notify the transmission of the first signals to the first device using the first plurality of channel resources, and the transmission of the second signals to the second device using the second plurality of channel resources, and
the first signals and the second signals include same information.

5. The information processing apparatus according to claim 1, wherein, based on reception power of the first signals and the second signals, the circuitry is further configured to determine at least one of the first device or the second device.

6. The information processing apparatus according to claim 1, wherein each of the first device and the second device provides a notification of results of reception of multicast transmission to each of the first device and the second device, using one of the first plurality of channel resources or the second plurality of channel resources.

7. The information processing apparatus according to claim 1, wherein the circuitry is further configured to provide information necessary for the first device and the second device to transmit the first signals and the second signals.

8. A communication system, comprising:
a first information processing apparatus; and
a plurality of second information processing apparatuses, wherein
the first information processing apparatus comprising a processor configured to:
assign a first plurality of channel resources for a first wireless communication to a second apparatus of the plurality of second information processing apparatuses;
assign a second plurality of channel resources for a second wireless communication to a third apparatus of the plurality of second information processing apparatuses; and
send a trigger frame that includes assignment information indicating the assignment of the first plurality of channel resources to the second apparatus and the assignment of the second plurality of channel resources to the third apparatus,
the plurality of second information processing apparatuses configured to concurrently transmit, upon receipt of the trigger frame, first signals using the first plurality of channel resources and second signals using the second plurality of channel resources to the first information processing apparatus,
the first plurality of channel resources is different from the second plurality of channel resources,
each of the first plurality of channel resources is different, and
each of the second plurality of channel resources is different.

9. The information processing apparatus according to claim 1, wherein the trigger frame further indicates:
information of at least one transmission parameter for the transmission of the first signals and the second signals, and
information to be transmitted by the first device and the second device in response to the trigger frame.

* * * * *